US012684394B2

(12) United States Patent
Ly et al.

(10) Patent No.: US 12,684,394 B2
(45) Date of Patent: Jul. 14, 2026

(54) CSI PAYLOAD REDUCTION FOR SPATIAL AND POWER DOMAIN ADAPTATION

(71) Applicant: QUALCOMM Incorporated, San Diego, CA (US)

(72) Inventors: Hung Dinh Ly, San Diego, CA (US); Changhwan Park, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 18/448,119

(22) Filed: Aug. 10, 2023

(65) Prior Publication Data

US 2025/0056279 A1     Feb. 13, 2025

(51) Int. Cl.
*H04W 24/10* (2009.01)
*H04B 7/06* (2006.01)
*H04L 5/00* (2006.01)

(52) U.S. Cl.
CPC .......... *H04W 24/10* (2013.01); *H04B 7/0626* (2013.01); *H04L 5/0051* (2013.01)

(58) Field of Classification Search
CPC .... H04W 24/10; H04B 7/0626; H04L 5/0051; H04L 5/005; H04L 5/0057; H04L 5/0094
See application file for complete search history.

(56) References Cited

U.S. PATENT DOCUMENTS

2017/0141831 A1*  5/2017  Rico Alvarino ..... H04B 7/0626
2024/0414652 A1* 12/2024  Hindy .................. H04B 7/0639
2025/0030471 A1*  1/2025  Chen ................... H04W 72/231

OTHER PUBLICATIONS

International Search Report and Written Opinion—PCT/US2024/038967—ISA/EPO Oct. 4, 2024—15 pages.
Mediatek Inc: "On Network Energy Saving Techniques in Spatial and Power Domains",3GPP TSG RAN WG1 #113, R1-2305676, 3rd Generation Partnership Project, Mobile Competence Centre, 650, Route Des Lucioles, F-06921 Sophia-Antipolis Cedex, France vol. RAN WG1, No. Incheon, Korea, May 22, 2023-May 26, 2023, 7 Pages, May 15, 2023, XP052385991, Section 4.
(Continued)

*Primary Examiner* — Ian N Moore
*Assistant Examiner* — Latresa A Mccallum
(74) *Attorney, Agent, or Firm* — Procopio, Cory, Hargreaves & Savitch LLP

(57)     ABSTRACT

A method for wireless communication at a user equipment (UE) and related apparatus are provided. In the method, the UE receives, from a network entity, a channel state information (CSI) report configuration including a set of sub-configurations. Each sub-configuration in the set of sub-configurations corresponds to a transmission setting associated with a channel state information reference signal (CSI-RS). The UE further determines one or more CSIs respectively corresponding to a subset of the set of sub-configurations, and transmits, based on the transmission setting corresponding to a first sub-configuration of the subset of sub-configurations, a reduced content of a CSI report or refrains from transmitting the CSI report. The CSI report is associated with a first CSI for the first sub-configuration.

28 Claims, 13 Drawing Sheets

(56)                    References Cited

OTHER PUBLICATIONS

NTT DOCOMO, Inc: "Discussion on Spatial and Power Domain Enhancements for NW Energy Savings", 3GPP TSG RAN WG1 #113, R1-2305608, 3rd Generation Partnership Project, Mobile Competence Centre, 650, Route Des Lucioles, F-06921 Sophia-Antipolis cedex, France, vol. RAN WG1, No. Incheon, Korea, May 22, 2023-May 26, 2023, 6 Pages, May 15, 2023, XP052385928, Sections 1, 3 and 4.

ZTE, et al., "Discussion on NES Techniques in Spatial and Power Domains", 3GPP TSG RAN WG1 #113, R1-2306011, Type Discussion, NETW Energy NR-Core, 3rd Generation Partnership Project, Mobile Competence Centre, 650, Route Des Lucioles, F-06921 Sophia-Antipolis cedex, France, vol. 3GPP RAN 1, No. Incheon, Korea, May 22, 2023-May 26, 2023, pp. 1-35, May 19, 2023, XP052311388, Section 4.

* cited by examiner

400

410
Step 1
CSF for adaptation of spatial elements

420
Step 2
PDSCH with a suitable configuration of spatial elements on/off adaptation (at physical antenna element level)

on/off adaptation (at logical antenna port level)

600

610
Step 1
CSF for adaptation of power offset values

620
Step 2
PDSCH with a suitable power offset configuration

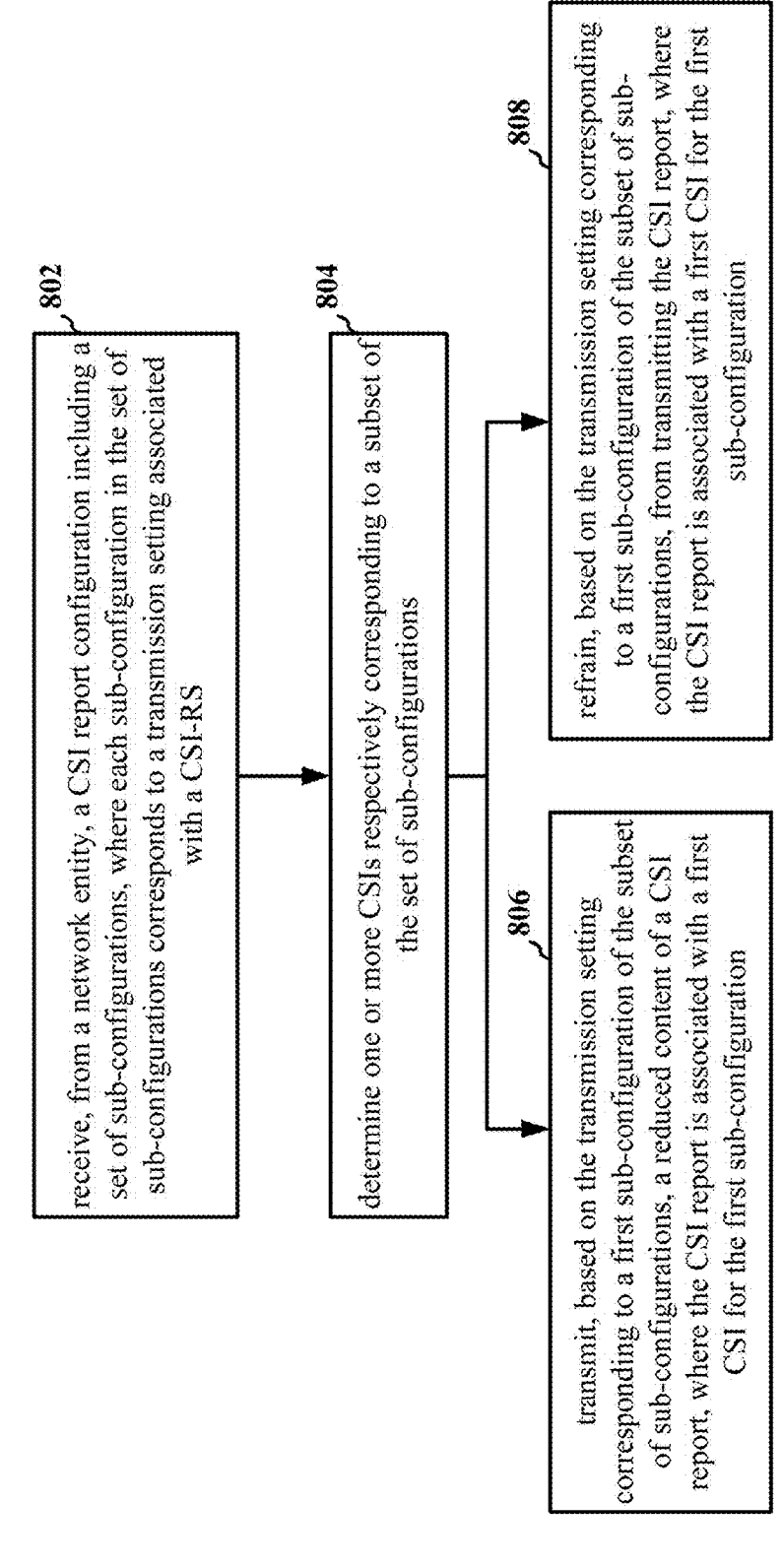

802 receive, from a network entity, a CSI report configuration including a set of sub-configurations, where each sub-configuration in the set of sub-configurations corresponds to a transmission setting associated with a CSI-RS

804 determine one or more CSIs respectively corresponding to a subset of the set of sub-configurations

806 transmit, based on the transmission setting corresponding to a first sub-configuration of the subset of sub-configurations, a reduced content of a CSI report, where the CSI report is associated with a first CSI for the first sub-configuration

808 refrain, based on the transmission setting corresponding to a first sub-configuration of the subset of sub-configurations, from transmitting the CSI report, where the CSI report is associated with a first CSI for the first sub-configuration

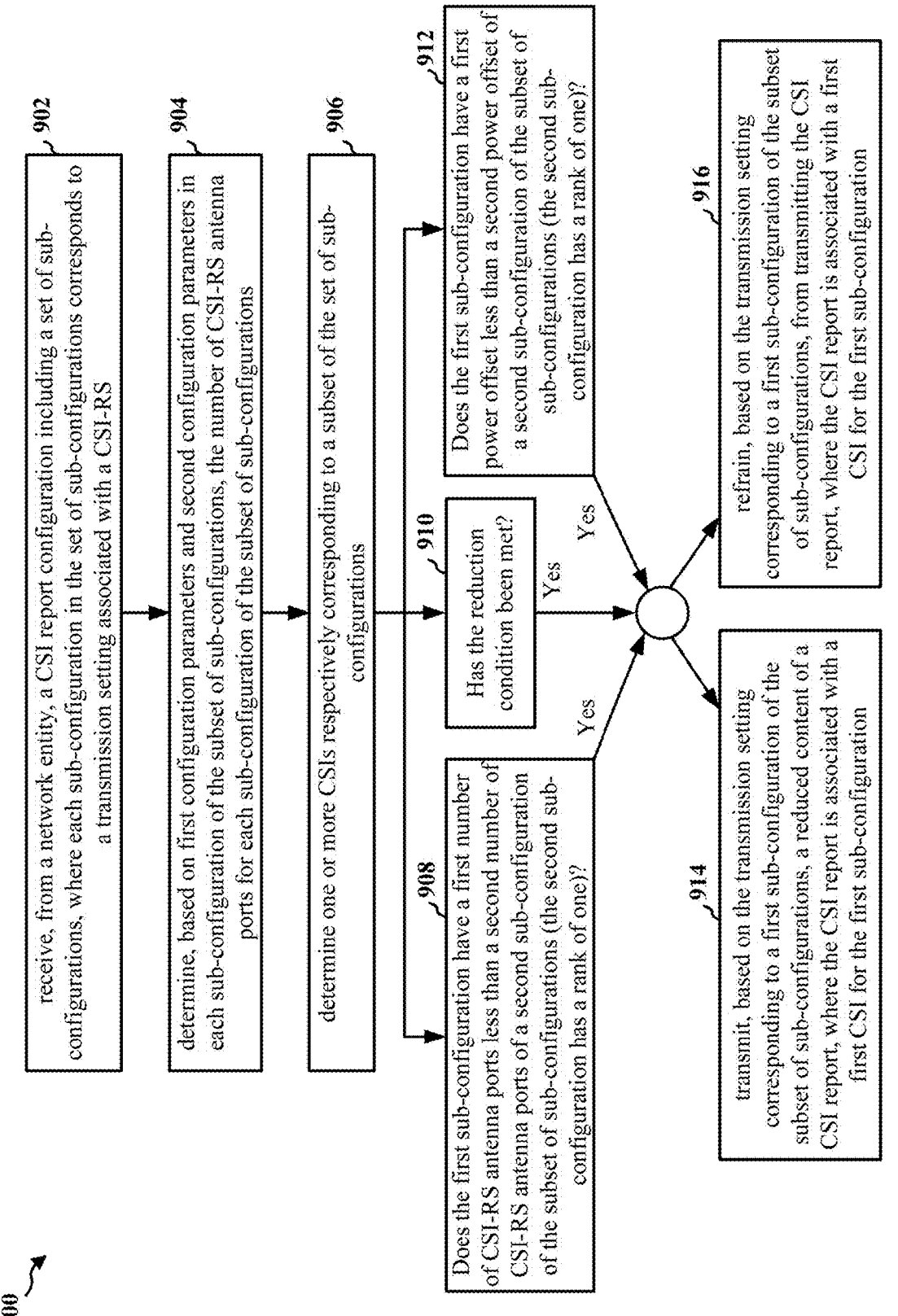

902 — receive, from a network entity, a CSI report configuration including a set of sub-configurations, where each sub-configuration in the set of sub-configurations corresponds to a transmission setting associated with a CSI-RS 904 — determine, based on first configuration parameters and second configuration parameters in each sub-configuration of the subset of sub-configurations, the number of CSI-RS antenna ports for each sub-configuration of the subset of sub-configurations 906 — determine one or more CSIs respectively corresponding to a subset of the set of sub-configurations 908 — Does the first sub-configuration have a first number of CSI-RS antenna ports less than a second number of CSI-RS antenna ports of a second sub-configuration of the subset of sub-configurations (the second sub-configuration has a rank of one)?

910 — Has the reduction condition been met?

912 — Does the first sub-configuration have a first power offset less than a second power offset of a second sub-configuration of the subset of sub-configurations (the second sub-configuration has a rank of one)?

Yes    Yes    Yes

914 — transmit, based on the transmission setting corresponding to a first sub-configuration of the subset of sub-configurations, a reduced content of a CSI report, where the CSI report is associated with a first CSI for the first sub-configuration 916 — refrain, based on the transmission setting corresponding to a first sub-configuration of the subset of sub-configurations, from transmitting the CSI report, where the CSI report is associated with a first CSI for the first sub-configuration

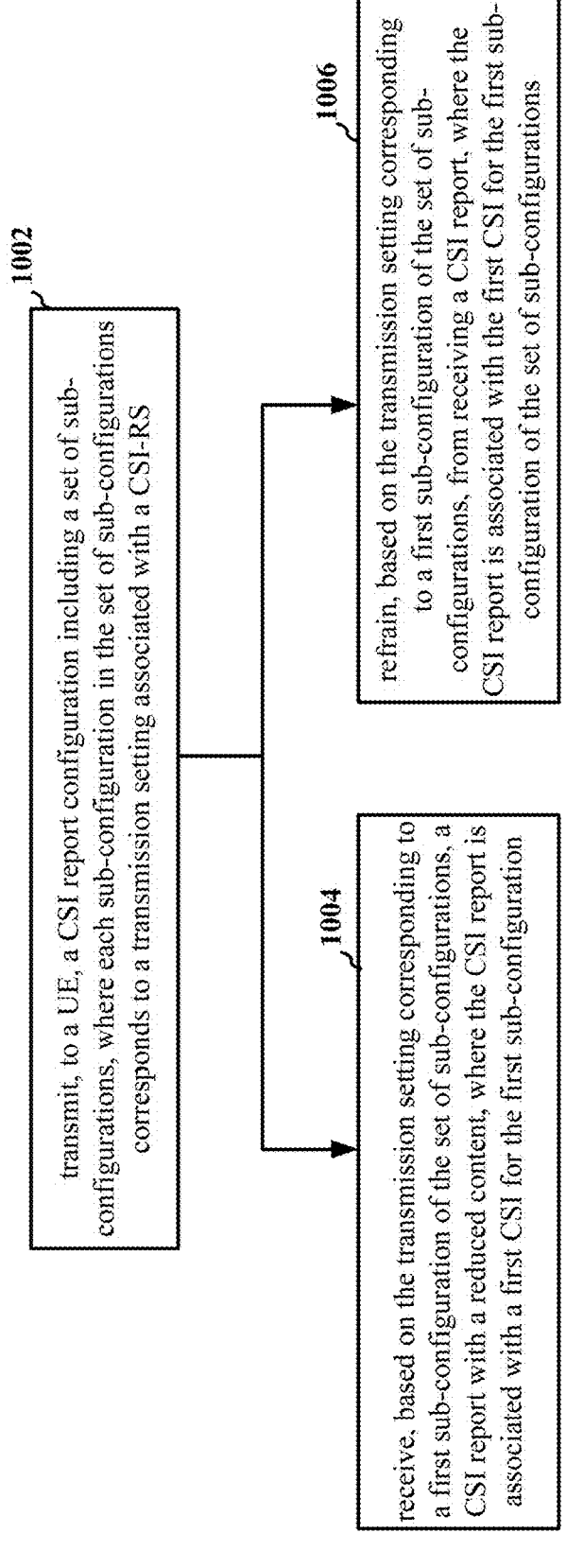

1002 transmit, to a UE, a CSI report configuration including a set of sub-configurations, where each sub-configuration in the set of sub-configurations corresponds to a transmission setting associated with a CSI-RS

1004 receive, based on the transmission setting corresponding to a first sub-configuration of the set of sub-configurations, a CSI report with a reduced content, where the CSI report is associated with a first CSI for the first sub-configuration

1006 refrain, based on the transmission setting corresponding to a first sub-configuration of the set of sub-configurations, from receiving a CSI report, where the CSI report is associated with the first CSI for the first sub-configuration of the set of sub-configurations

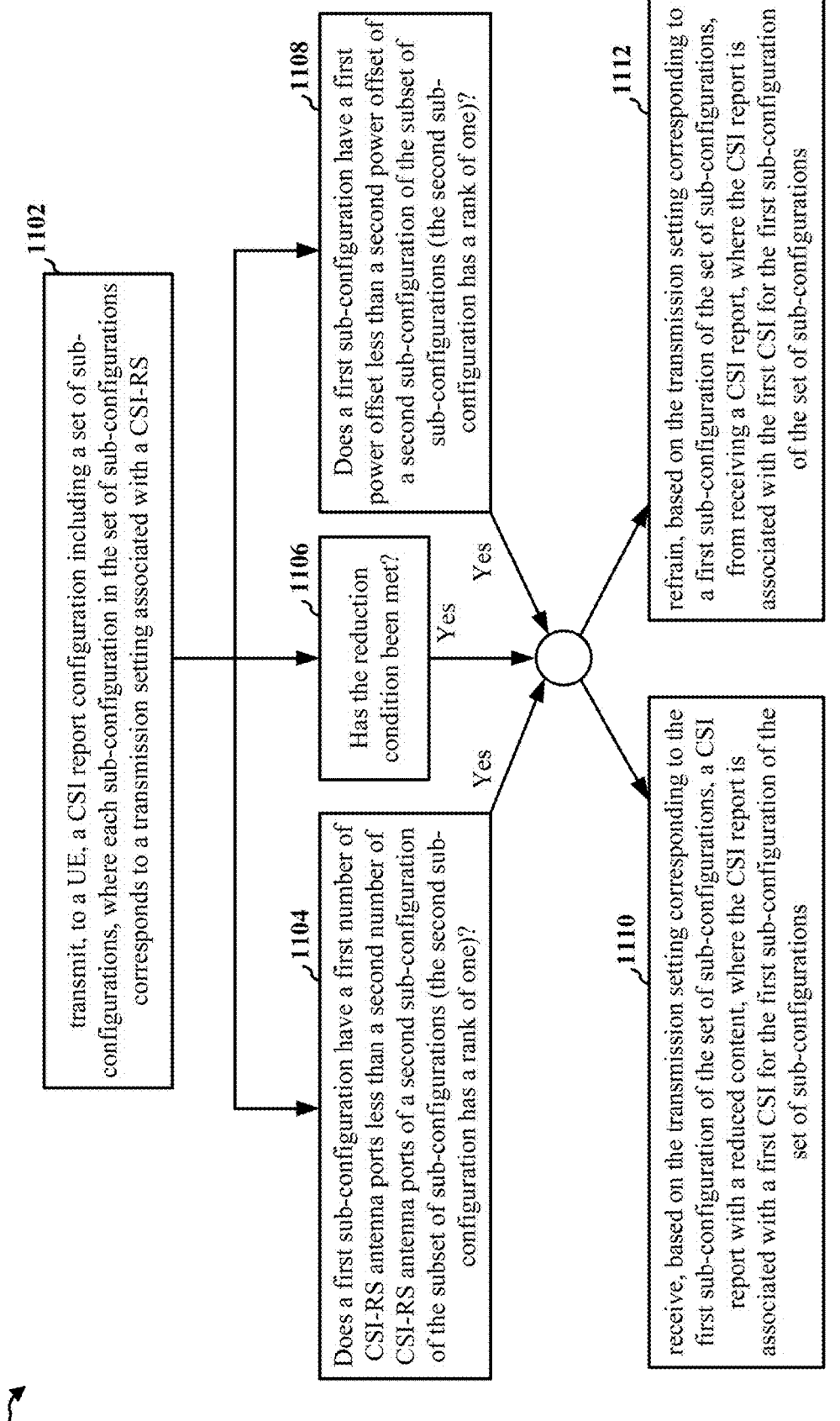

1102
transmit, to a UE, a CSI report configuration including a set of sub-configurations, where each sub-configuration in the set of sub-configurations corresponds to a transmission setting associated with a CSI-RS 1104
Does a first sub-configuration have a first number of CSI-RS antenna ports less than a second number of CSI-RS antenna ports of a second sub-configuration of the subset of sub-configurations (the second sub-configuration has a rank of one)?

1106
Has the reduction condition been met?

1108
Does a first sub-configuration have a first power offset less than a second power offset of a second sub-configuration of the subset of sub-configurations (the second sub-configuration has a rank of one)?

Yes

Yes

Yes 1110
receive, based on the transmission setting corresponding to the first sub-configuration of the set of sub-configurations, a CSI report with a reduced content, where the CSI report is associated with a first CSI for the first sub-configuration of the set of sub-configurations 1112
refrain, based on the transmission setting corresponding to a first sub-configuration of the set of sub-configurations, from receiving a CSI report, where the CSI report is associated with the first CSI for the first sub-configuration of the set of sub-configurations

CSI PAYLOAD REDUCTION FOR SPATIAL AND POWER DOMAIN ADAPTATION

TECHNICAL FIELD

The present disclosure relates generally to communication systems, and more particularly, to channel state information (CSI) payload reduction for spatial and power domain adaptation for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include at least one memory and at least one processor coupled to the at least one memory. Based at least in part on information stored in the at least one memory, the at least one processor, individually or in any combination, may be configured to receive, from a network entity, a CSI report configuration including a set of sub-configurations, where each sub-configuration in the set of sub-configurations corresponds to a transmission setting associated with a channel state information reference signal (CSI-RS); determine one or more CSIs respectively corresponding to a subset of the set of sub-configurations; and transmit, based on the transmission setting corresponding to a first sub-configuration of the subset of sub-configurations, a reduced content of a CSI report or refrain from transmitting the CSI report. The CSI report may be associated with a first CSI for the first sub-configuration.

In an aspect of the disclosure, a method, a computer-readable medium, and an apparatus are provided for wireless communication at a network entity. The apparatus may include at least one memory and at least one processor coupled to the at least one memory. Based at least in part on information stored in the at least one memory, the at least one processor, individually or in any combination, may be configured to transmit, to a UE, a CSI report configuration including a set of sub-configurations, where each sub-configuration in the set of sub-configurations corresponds to a transmission setting associated with a CSI-RS; and receive, based on the transmission setting corresponding to a first sub-configuration of the set of sub-configurations, the CSI report with a reduced content or refrain from receiving the CSI report. The CSI report may be associated with a first CSI for the first sub-configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 8 is a flowchart illustrating methods of wireless communication at a UE in accordance with various aspects of the present disclosure.

FIG. 9 is a flowchart illustrating methods of wireless communication at a UE in accordance with various aspects of the present disclosure.

FIG. 10 is a flowchart illustrating methods of wireless communication at a network entity in accordance with various aspects of the present disclosure.

FIG. 11 is a flowchart illustrating methods of wireless communication at a network entity in accordance with various aspects of the present disclosure.

DETAILED DESCRIPTION

Figure 1:
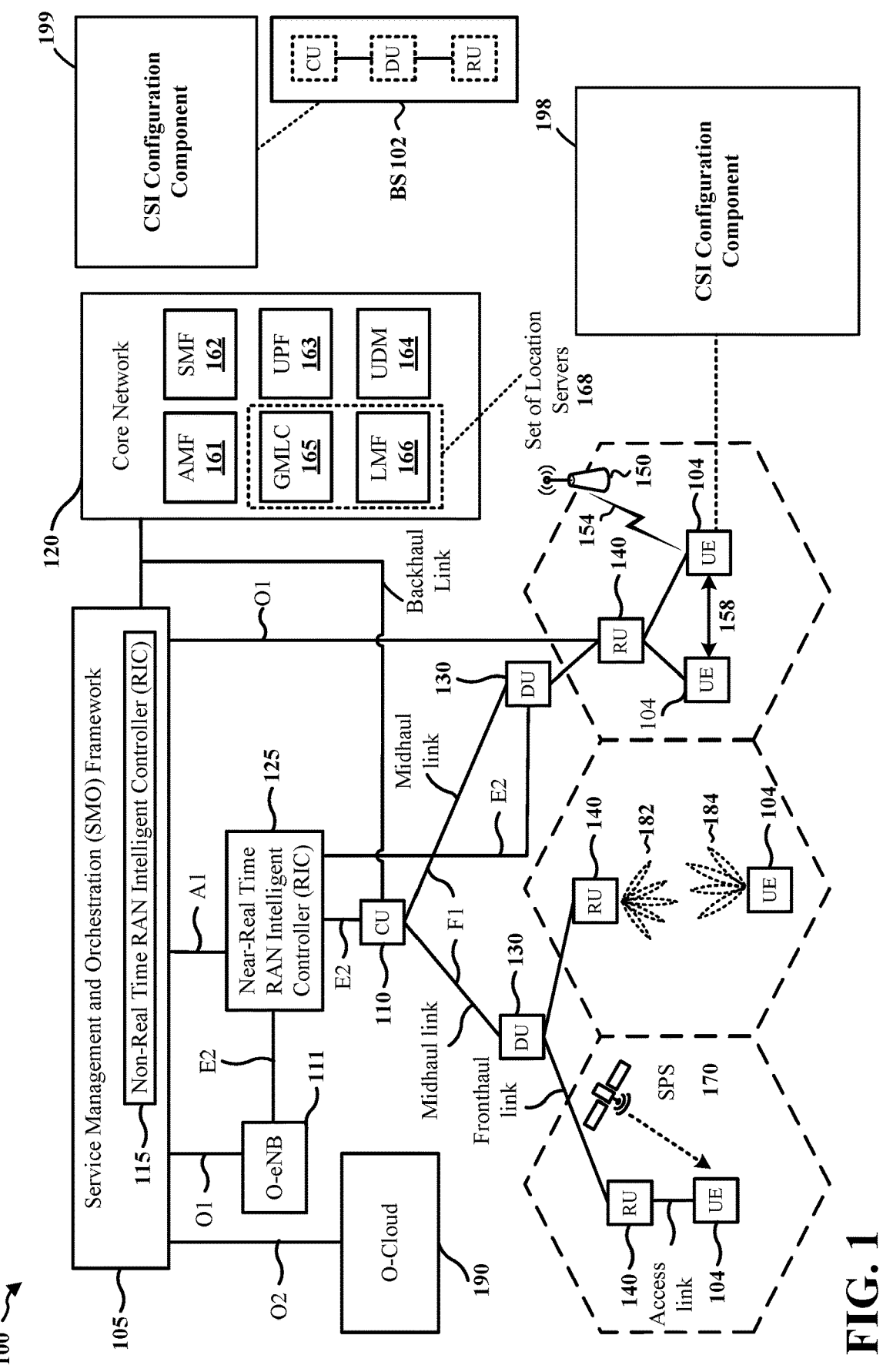
FIG. 1 is a diagram illustrating an example of a wireless communication system and an access network.

The CSI provides information for efficient resource allocation and optimized network performance. As the network complexity increases with the development of diverse services, applications, and devices, a CSI report may include CSIs associated with multiple sub-configurations. Handling CSI with multiple sub-configurations can be a complex task, with varying degrees of efficiency and effectiveness in different scenarios. Example aspects provided herein present methods and apparatus for CSI payload reduction for spatial and power domain adaptation associated with multiple sub-configurations.

Various aspects relate generally to wireless communication. Some aspects more specifically relate to CSI payload reduction for spatial and power domain adaptation for wireless communication. In some examples, a UE may receive, from a network entity, a CSI report configuration including a set of sub-configurations. Each sub-configuration in the set of sub-configurations may correspond to a transmission setting associated with a CSI-RS. The UE further determines one or more CSIs respectively corresponding to a subset of the set of sub-configurations; and transmits, based on the transmission setting corresponding to a first sub-configuration of the subset of sub-configurations, a reduced content of a CSI report or refrain from transmitting the CSI report. The CSI report may be associated with a first CSI for the first sub-configuration.

Particular aspects of the subject matter described in this disclosure can be implemented to realize one or more of the following potential advantages. In some examples, by reducing the overhead associated with CSI report payloads, the described techniques can be used to improve the efficiency of wireless communication. In some aspects, by allowing the UE to refrain from reporting CSI reports or report a subset of CSI parameters for sub-configurations under specific conditions, the described techniques may be used to reduce the amount of data to be sent as part of CSI reports, thereby reducing the overhead associated with the CSI reports. In some examples, by making CSI reporting dependent on parameters like CSI-RS power configuration and number of antenna ports, the described techniques promote more efficient use of these resources, leading to power savings and better antenna utilization.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well-known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CSI configuration component 198. The CSI configuration component 198 may be configured to receive, from a network entity, a CSI report configuration including a set of sub-configurations, where each sub-configuration in the set of sub-configurations corresponds to a transmission setting associated with a CSI-RS; determine one or more CSIs respectively corresponding to a subset of the set of sub-configurations; and transmit, based on the transmission setting corresponding to a first sub-configuration of the subset of sub-configurations, a reduced content of a CSI report or refrain from transmitting the CSI report, where the CSI report is associated with a first CSI for the first sub-configuration. In certain aspects, the base station 102 may include a CSI configuration component 199. The CSI configuration component 199 may be configured to transmit, to a UE, a CSI report configuration including a set of sub-configurations, where each sub-configuration in the set of sub-configurations corresponds to a transmission setting associated with a CSI-RS; and receive, based on the transmission setting corresponding to a first sub-configuration of the set of sub-configurations, the CSI report with a reduced content or refrain from receiving the CSI report, where the CSI report is associated with a first CSI for the first sub-configuration. Although the following description may be focused on 5G NR, the concepts described herein may be applicable to other similar areas, such as LTE, LTE-A, CDMA, GSM, and other wireless technologies.

Figures 2A, 2B, 2C, 2D:
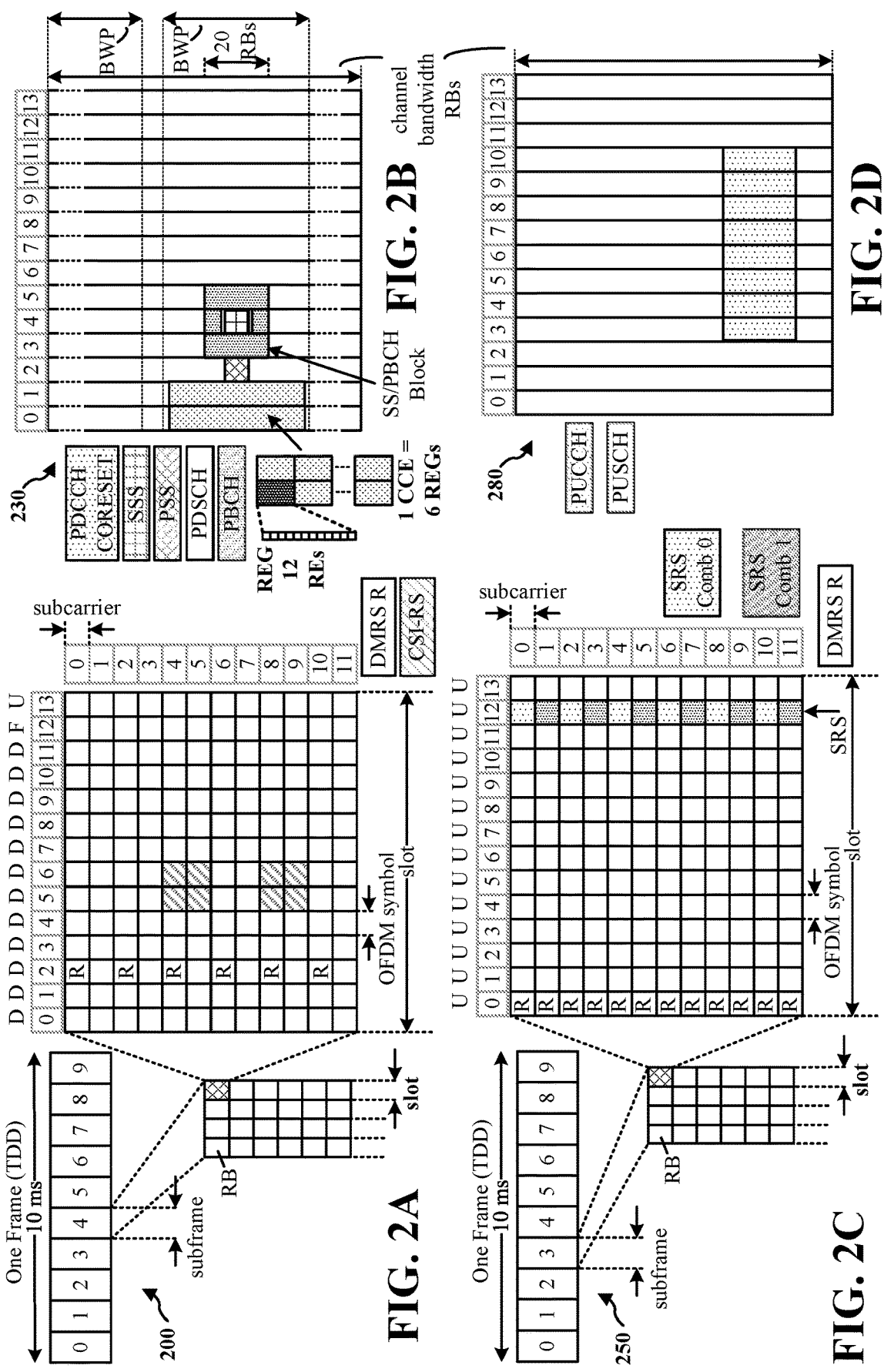
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIG. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended.

For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
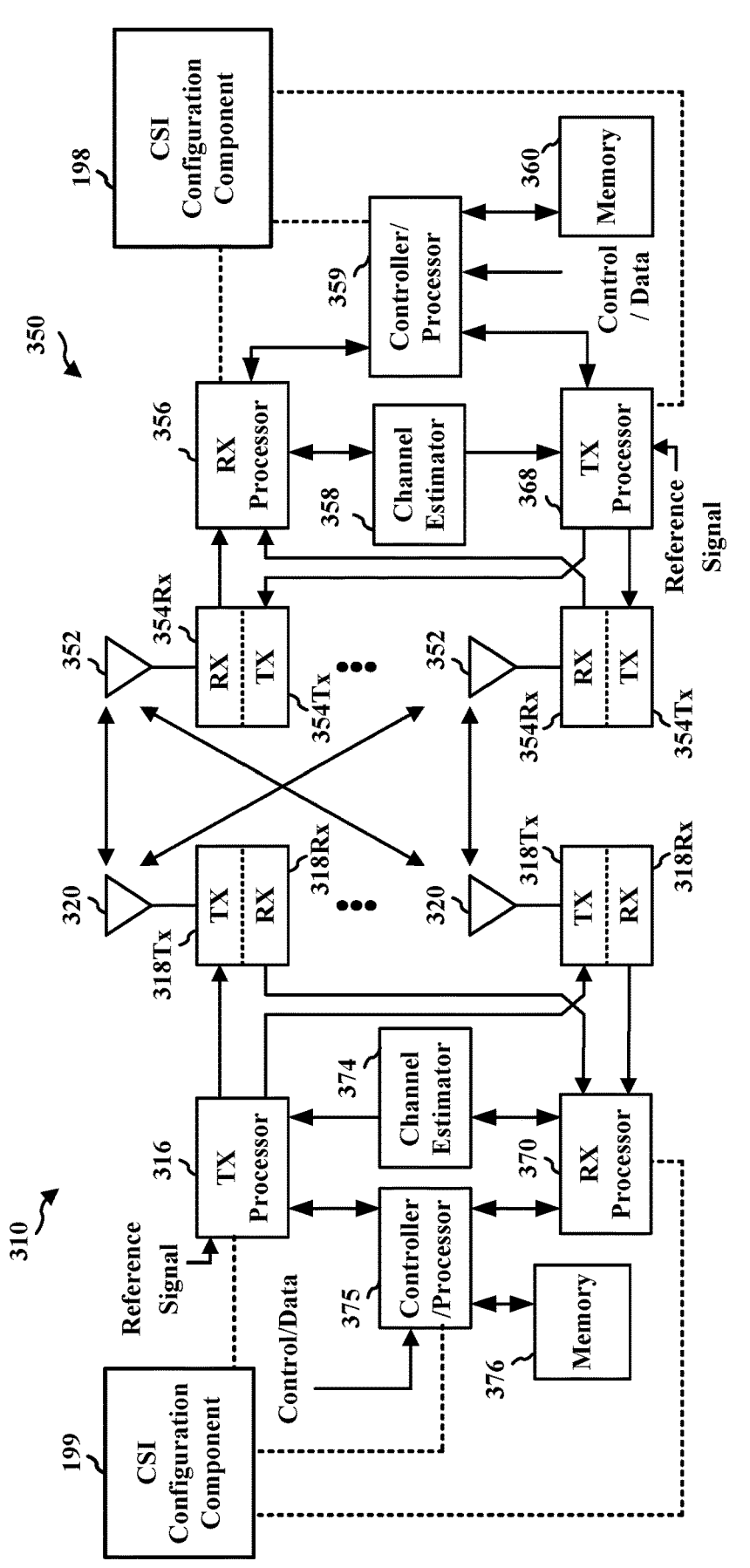
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CSI configuration component 198 of FIG. 1.

At least one of the TX processor 316, the RX processor 370, and the controller/processor 375 may be configured to perform aspects in connection with the CSI configuration component 199 of FIG. 1.

Example aspects of the present disclosure provide methods and apparatus related to CSI payload reduction schemes for spatial domain (SD) or power domain (PD) adaptation for network energy savings (e.g., the spatial element adaptation and/or power domain adaptation for reducing network power consumption).

Massive multiple-input multiple-output (MIMO) technology is one of the fundamental technologies in 5G NR for high spectral efficiency and extended coverage. For downlink transmissions, massive MIMO may be equipped with a large number of transceiver chains (e.g., 64 chains in FR1 are typically deployed in commercial 5G networks, especially at the carrier frequency of 3.5 GHz or higher). Each transceiver chain may be connected to one or more power amplifiers. However, the power amplifiers connected to these transceiver chains may consume approximately 70%-80% of base station (BS) power.

To reduce BS power consumption, a cell may turn on/off one or more power amplifiers, or equivalently, transceiver chains, depending on the time/frequency resource utilization within the cell. This on/off adaptation scheme, while feasible under current standards, may be further improved as being standardized. The focus may be on necessary enhancements on CSI and beam management to enable more efficient adaptation of spatial elements.

Two types of spatial domain (SD) adaptations may be utilized. The first, Type 1 SD adaptation, adapts the configuration of logical antenna ports for CSI-reference signals (CSI-RS) and/or PDSCH. The second, Type 2 SD adaptation, adapts the configuration of physical antenna elements for CSI-RS and/or PDSCH. The latter type is particularly useful for FR2 where the number of transmit receive units (TxRUs) at the base station is limited (typically to 1 or 2). The number of logical antenna ports may remain unchanged while the number of physical antenna elements can be adapted, thereby impacting the beamforming gain.

Figure 4:
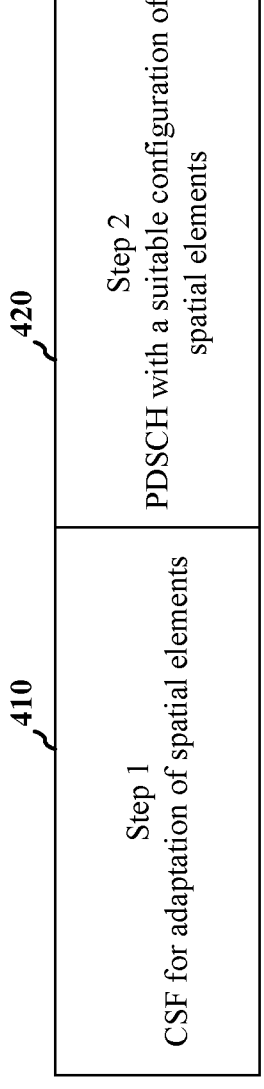
FIG. 4 is a diagram illustrating an example two-step implementation of spatial element adaptation.

Various enhancements to the CSI framework may be utilized to support the SD adaptation. FIG. 4 is a diagram 400 illustrating an example two-step implementation of spatial element adaptation. In FIG. 4, the first step 410 (Step 1) may involve CSI feedback (CSF) for the adaptation of spatial elements. In this step, the base station may configure a CSI report configuration with multiple sub-configurations, each corresponding to a CSI-RS antenna port configuration. The UE may measure and report CSI associated with all or a subset of sub-configurations based on network indication, which may indicate to the UE which subset of sub-configurations to measure and report. In the second step 420 (Step 2), the base station may switch among different configurations of active spatial elements (for PDSCH transmission) based on the CSI reports received from the UE.

Figures 5A, 5B:
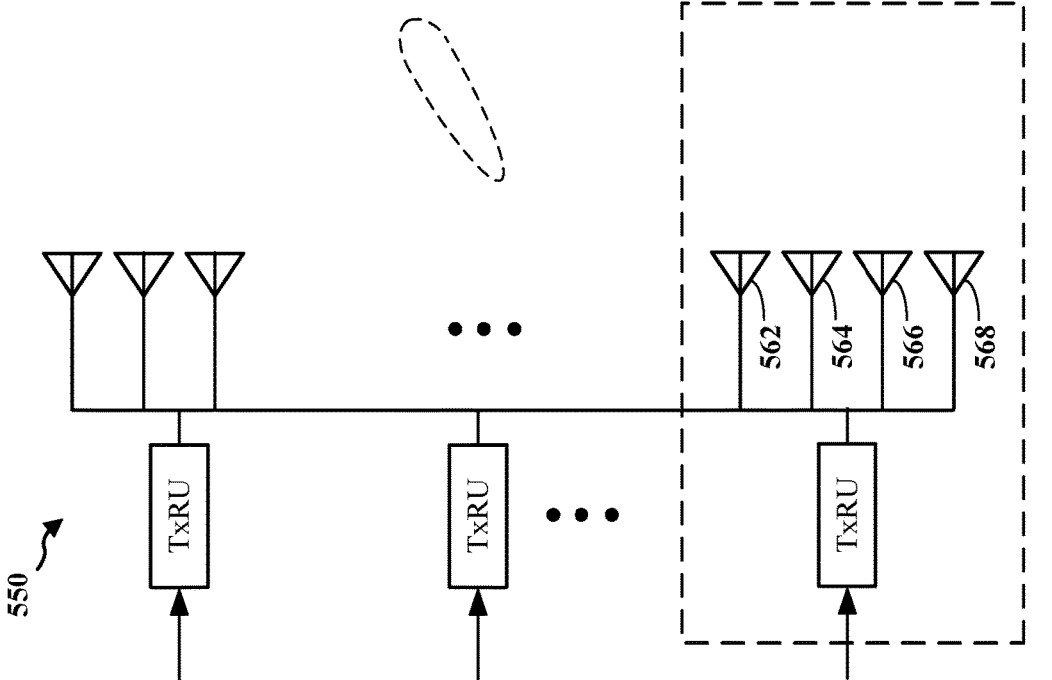
FIG. 5A is a diagram illustrating an example Type 1 spatial domain (SD) adaptation.
FIG. 5B is a diagram illustrating an example Type 2 SD adaptation.

FIG. 5A is a diagram 500 illustrating an example Type 1 SD adaptation. In FIG. 5A, the configuration of logical antenna ports for CSI-RS and/or PDSCH may be adapted. As an example, the configuration of logical antenna ports may be the configuration for logical antenna ports 512, 514, 516, and 518. FIG. 5B is a diagram 550 illustrating an example Type 2 SD adaptation configuration of physical antenna ports for CSI-RS and/or PDSCH. As an example, the configuration of physical antenna ports may be the configuration for physical antenna ports 562, 564, 566, and 568. Dynamic adaptation of the power offset values between PDSCH and CSI-RS may be beneficial for network energy savings. Hence, the enhancements on CSI may lead to efficient adaptation of power offset values between PDSCH and CSI-RS. Through the adaptation of the power offset values, the base station may be capable of compensating for some measurements (e.g., layer 1-reference signal received power (L1-RSRP) and channel quality indicator (CQI)) based on the transmission power difference between the actual power offset and the configured power offset that the UE uses for the CSI report. This compensation mechanism is compatible with existing standards, especially when the transmission power difference is not substantial. However, when the transmission power difference is large, the compensation at the base station may not be accurately applied to parameters such as rank indicator (RI) and/or precoding matrix indicator (PMI).

Figure 6:
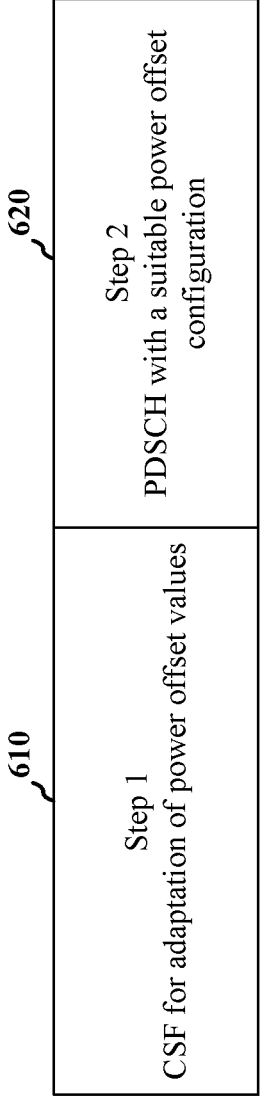
FIG. 6 is a diagram illustrating an example two-step implementation of power offset values adaptation.

To accomplish dynamic adaptation of the power offset values between PDSCH and CSI-RS, a two-step procedure may be used. FIG. 6 is a diagram 600 illustrating an example two-step implementation of power offset values adaptation. As shown in FIG. 6, the first step 610 (Step 1) may involve CSF for the adaptation of power offset values. The second step 620 (Step 2) may include the transmission of PDSCH with a suitable power offset configuration. The CSI framework for power domain (PD) adaptation may be similar to that of SD adaptation. However, the distinction lies in defining the sub-configuration. For PD adaptation, the sub-configuration may contain the power offset value between PDSCH and CSI-RS.

Example aspects presented herein provide methods and apparatus for CSI report payload reduction.

The methods address the question related to the process that, if a UE determines, based on the resources within a sub-configuration, that the rank of the sub-configuration equals one, whether the UE should report CSI for a sub-configuration with fewer CSI-reference signal (CSI-RS) antenna ports (Type 1), lower CSI-RS power configuration (Type 2), or a smaller PDSCH power configuration (PD). In some aspects, the possibility of UE skipping reporting (e.g., refraining from reporting) one or more CSIs associated with different sub-configurations may lead to a significant reduction in CSI report overhead, potentially exceeding that of reporting common channel rank indicator (CRI) or precoding matrix indicator (PMI) for sub-configurations.

The number of CSI-RS antenna ports in a sub-configuration may be determined by the parameters (N1, N2) configured within the sub-configuration. In some aspects, in Type 1 SD adaptation, if the UE identifies that the CSI for one sub-configuration, annotated as sub-configuration k, has a rank of 1, the UE may react following one of the two options described below.

In the first option, the UE may not report (e.g., the UE refrains from transmitting) CSI for a sub-configuration with fewer CSI-RS antenna ports than those in sub-configuration k.

In the second option, the UE may report a subset of CSI parameters (e.g., the UE reports a reduced content of the CSI report) for a sub-configuration with fewer CSI-RS antenna ports than those in sub-configuration k. In some examples, the subset of CSI parameters to be reported may not include the RI. In some examples, the subset of CSI parameters may include one or more parameters from Part 1 CSI, such as CRI and/or CQI.

The CSI report skip or reduction may be further extended to CSI associated with PD adaptation. In some aspects, for PD adaptation (e.g., the adjustment of the power offset between PDSCH and CSI-RS), if the UE identifies that the CSI for one sub-configuration, annotated as sub-configuration k, has a rank of one, the UE may react following one of the two options described below.

In the first option, the UE may not report (e.g., the UE refrains from transmitting) CSI for a sub-configuration with a smaller power offset value between PDSCH and CSI-RS than that in sub-configuration k.

In the second option, the UE may report a subset of CSI parameters (e.g., the UE may report a reduced content of CSI report) for a sub-configuration with a smaller power offset value between PDSCH and CSI-RS than that in sub-configuration k. In some examples, the subset of CSI parameters to be reported may not include the RI. In some examples, the subset of CSI parameters may include one or more parameters from Part 1 CSI, such as CRI and/or CQI.

In some aspects, for Type 2 adaptation, if the UE identifies that the CSI for sub-configuration k has a rank of one, the UE may react following one of the two options described below.

In the first option, the UE may not report (e.g., the UE refrains from transmitting) CSI for a sub-configuration with a smaller power offset value between the CSI-RS and the SSB than that in sub-configuration k.

In the second option, the UE may report a subset of CSI parameters (e.g., the UE reports a reduced content of CSI report) for a sub-configuration with a smaller power offset value between the CSI-RS and the SSB than that in sub-configuration k. In some examples, the subset of CSI parameters to be reported may not include the RI. In some examples, the subset of CSI parameters may include one or more parameters from Part 1 CSI, such as CRI and/or CQI.

In some aspects, the UE may be configured with a joint operation of Type 1 SD adaptation and PD adaptation. In those scenarios, if the UE identifies that the CSI for sub-configuration k has a rank of one, the UE may assess whether all or part of the CSI for another sub-configuration may be reported. This assessment may involve checking both the CSI-RS antenna port configuration and the PDSCH/CSI-RS power offset configuration in the sub-configuration.

In some aspects, if the sub-configuration's CSI-RS antenna port configuration matches that of sub-configuration k (i.e., the sub-configuration that has the rank of one), and the power offset value between PDSCH and CSI-RS in the sub-configuration is smaller than that in sub-configuration k, then the UE may skip reporting (e.g., refrain from reporting) all the CSI parameters, or report a subset of the CSI parameters in the sub-configuration.

In some aspects, if the power offset value between PDSCH and CSI-RS in the sub-configuration is the same as that in sub-configuration k (i.e., the sub-configuration that has the rank of one), and the number of CSI-RS antenna ports in the sub-configuration is smaller than that in sub-configuration k, then the UE may skip reporting (e.g., refrain from reporting) all the CSI parameters, or report a subset of the CSI parameters in the sub-configuration.

Figure 7:
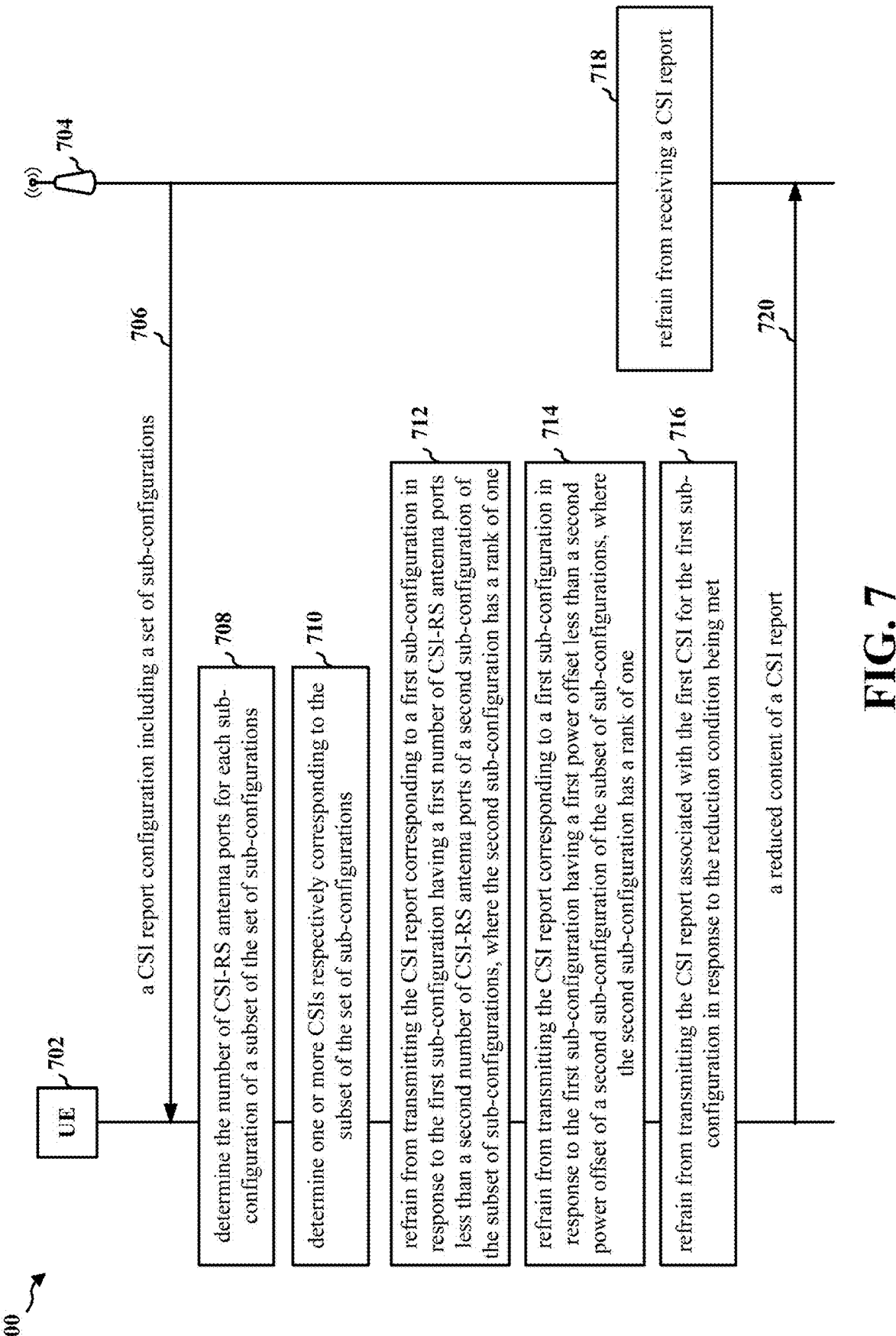
FIG. 7 is a call flow diagram illustrating a method of wireless communication in accordance with various aspects of the present disclosure.

FIG. 7 is a call flow diagram 700 illustrating a method of wireless communication in accordance with various aspects of this present disclosure. Various aspects are described in connection with a UE 702 and a base station 704. The aspects may be performed by the UE 702 or the base station 704 in aggregation and/or by one or more components of a base station 704 (e.g., such as a CU 110, a DU 130, and/or an RU 140).

As shown in FIG. 7, at 706, the UE 702 may receive a CSI report configuration from the base station 704. The CSI report configuration may include a set of sub-configurations, and each sub-configuration in the set of sub-configurations may correspond to a transmission setting associated with a CSI-RS. For example, the transmission setting corresponding to one sub-configuration (e.g., the first sub-configuration) of the set of sub-configurations may include one or more: the number of CSI-RS antenna ports for the first sub-configuration or the power offset associated with a PDSCH for the first sub-configuration. For example, referring to FIG. 5A and FIG. 5B, the transmission setting corresponding to one sub-configuration may include the number of CSI-RS antenna ports (e.g., antenna ports 512, 514, 516, and 518, or antenna ports 562, 564, 566, and 568) associated with the sub-configuration.

In some aspects, at 708, the UE 702 may determine the number of CSI-RS antenna ports for each sub-configuration of a subset of the set of sub-configurations. For example, the UE 702 may determine the number of CSI-RS antenna ports based on first configuration parameters and second configuration parameters (e.g., N1 and N2) in each sub-configuration of the subset of sub-configurations.

At 710, the UE 702 may determine one or more CSIs respectively corresponding to the subset of the set of sub-configurations.

In some aspects, at 712, the UE 702 may refrain from transmitting the CSI report corresponding to a first sub-configuration in response to the first sub-configuration having a first number of CSI-RS antenna ports less than a second number of CSI-RS antenna ports of a second sub-configuration of the subset of sub-configuration, where the second sub-configuration has a rank of one.

In some aspect, at 714, the UE 702 may refrain from transmitting the CSI report corresponding to a first sub-configuration in response to the first sub-configuration having a first power offset less than a second power offset of a second sub-configuration of the subset of sub-configurations, where the second sub-configuration has a rank of one.

At 716, the base station 704 may refrain from transmitting the CSI report associated with the first CSI for the first sub-configuration in response to a reduction condition being met. In some examples, the reduction condition may include a first number of CSI-RS antenna ports associated with a first sub-configuration is equal to a second number of CSI-RS antenna ports associated with a second sub-configuration of the subset of sub-configurations, and a first power offset between the PDSCH and the CSI-RS associated with the first sub-configuration is smaller than a second power offset between the PDSCH and the CSI-RS associated with the second sub-configuration, where the second sub-configuration has a rank of one. In some examples, the reduction condition may include the first number of CSI-RS antenna ports associated with the first sub-configuration is less than a second number of CSI-RS antenna ports associated with a second sub-configuration of the subset of sub-configurations, and a first power offset between the PDSCH and the CSI-RS associated with the first sub-configuration is equal to a second power offset between the PDSCH and the CSI-RS associated with the second sub-configuration, where the second sub-configuration has a rank of one.

At 718, the base station 704 may skip receiving a CSI report (e.g., refrain from receiving a CSI report). For example, the CSI report may be associated with a first CSI for the first sub-configuration of the set of sub-configurations, and the base station 704 may skip receiving (e.g., refrain from receiving) the CSI report based on the transmission setting corresponding to the first sub-configuration of the set of sub-configurations. In some examples, the base station 704 may skip receiving (e.g., refrain from receiving) the CSI report if the first sub-configuration has a first number of CSI-RS antenna ports that is less than a second number of CSI-RS antenna ports of a second sub-configuration of the subset of sub-configurations, where the second sub-configuration has a rank of one. In some examples, the base station 704 may skip receiving (e.g., refrain from receiving) the CSI report if the first sub-configuration has a first power offset less than a second power offset of a second sub-configuration of the subset of sub-configurations, where the second sub-configuration has a rank of one. In some examples, the base station 704 may skip receiving (e.g., refrain from receiving) the CSI report in response to a reduction condition being met. In some examples, the reduction condition may include a first number of CSI-RS antenna ports is equal to a second number of CSI-RS antenna ports associated with a second sub-configuration of the subset of sub-configurations, and a first power offset between the PDSCH and the CSI-RS associated with the first sub-configuration is smaller than a second power offset between the PDSCH and the CSI-RS associated with the second sub-configuration, where the second sub-configuration has a rank of one. In some examples, the reduction condition may include a first number of CSI-RS antenna ports is less than a second number of CSI-RS antenna ports associated with a second sub-configuration of the subset of sub-configurations, and a first power offset between the PDSCH and the CSI-RS associated with the first sub-configuration is equal to a second power offset between the PDSCH and the CSI-RS associated with the second sub-configuration, where the second sub-configuration has a rank of one.

In some aspects, at 720, the UE 702 may transmit, based on the transmission setting corresponding to a first sub-configuration of the subset of sub-configurations, a reduced content of the CSI report. In some examples, the UE 702 may transmit the reduced content of the CSI report if the first sub-configuration has a first number of CSI-RS antenna ports that is less than a second number of CSI-RS antenna ports of a second sub-configuration of the subset of sub-configurations, where the second sub-configuration has a rank of one. In some examples, the UE 702 may transmit the reduced content of the CSI report if the first sub-configuration has a first power offset less than a second power offset of a second sub-configuration of the subset of sub-configurations, where the second sub-configuration has a rank of one. In some examples, the UE 702 may transmit the reduced content of the CSI report associated with the first CSI for the first sub-configuration in response to a reduction condition being met. In some examples, the reduction condition may include a first number of CSI-RS antenna ports is equal to a second number of CSI-RS antenna ports associated with a second sub-configuration of the subset of sub-configurations, and a first power offset between the PDSCH and the CSI-RS associated with the first sub-configuration is smaller than a second power offset between the PDSCH and the CSI-RS associated with the second sub-configuration, where the second sub-configuration has a rank of one. In some examples, the reduction condition may include a first number of CSI-RS antenna ports is less than a second number of CSI-RS antenna ports associated with a second sub-configuration of the subset of sub-configurations, and a first power offset between the PDSCH and the CSI-RS associated with the first sub-configuration is equal to a second power offset between the PDSCH and the CSI-RS associated with the second sub-configuration, where the second sub-configuration has a rank of one.

FIG. 8 is a flowchart 800 illustrating methods of wireless communication at a UE in accordance with various aspects of the present disclosure. The method may be performed by a UE. The UE may be the UE 104, 350, 702, or the apparatus 1204 in the hardware implementation of FIG. 12. The methods allow the UE to refrain from reporting CSI parameters or selectively report CSI parameters based on the rank and the parameters of the sub-configurations, such as the number of CSI-RS antenna ports or power configurations.

The methods reduce the overhead associated with the CSI reports and enhance the efficiency of wireless communication.

As shown in FIG. 8, at 802, the UE may receive, from a network entity, a CSI report configuration including a set of sub-configurations. Each sub-configuration in the set of sub-configurations may correspond to a transmission setting associated with a CSI-RS. The network entity may be a base station, or a component of a base station, in the access network of FIG. 1 or a core network component (e.g., base station 102, 310, 704; or the network entity 1202 in the hardware implementation of FIG. 12). FIGS. 5A, 5B, and 7 illustrate various aspects of the steps in connection with flowchart 800. For example, referring to FIG. 7, the UE 702 may receive, at 706, from a network entity (base station 704), a CSI report configuration including a set of sub-configurations. Each sub-configuration in the set of sub-configurations corresponds to a transmission setting associated with a CSI-RS. In some aspects, 802 may be performed by the CSI configuration component 198.

At 804, the UE may determine one or more CSIs respectively corresponding to a subset of the set of sub-configurations. For example, referring to FIG. 7, the UE 702 may determine, at 710, one or more CSIs respectively corresponding to a subset of the set of sub-configurations. In some aspects, 804 may be performed by the CSI configuration component 198.

At 806, the UE may transmit, based on the transmission setting corresponding to a first sub-configuration of the subset of sub-configurations, a reduced content of a CSI report. The CSI report may be associated with a first CSI for the first sub-configuration of the set of sub-configurations. For example, referring to FIG. 7, the UE 702 may transmit, at 720, based on the transmission setting corresponding to a first sub-configuration of the subset of sub-configurations, a reduced content of a CSI report. The CSI report may be associated with a first CSI for the first sub-configuration of the set of sub-configurations. In some aspects, 806 may be performed by the CSI configuration component 198.

Alternatively, at 808, the UE may refrain, based on the transmission setting corresponding to a first sub-configuration of the subset of sub-configurations, from transmitting the CSI report. The CSI report may be associated with a first CSI for the first sub-configuration. For example, referring to FIG. 7, the UE 702 may refrain, at 712, 714, or 716, based on the transmission setting (e.g., the number of CSI-RS antenna ports, the power offset, or a reduction condition) corresponding to a first sub-configuration of the subset of sub-configurations, from transmitting the CSI report. The CSI report may be associated with a first CSI for the first sub-configuration. In some aspects, 808 may be performed by the CSI configuration component 198.

FIG. 9 is a flowchart 900 illustrating methods of wireless communication at a UE in accordance with various aspects of the present disclosure. The method may be performed by a UE. The UE may be the UE 104, 350, 702, or the apparatus 1204 in the hardware implementation of FIG. 12. The methods allow the UE to refrain from reporting CSI parameters or selectively report CSI parameters based on the rank and the parameters of the sub-configurations, such as the number of CSI-RS antenna ports or power configurations. The methods reduce the overhead associated with the CSI reports and enhance the efficiency of wireless communication.

As shown in FIG. 9, at 902, the UE may receive, from a network entity, a CSI report configuration including a set of sub-configurations. Each sub-configuration in the set of sub-configurations may correspond to a transmission setting associated with a CSI-RS. The network entity may be a base station, or a component of a base station, in the access network of FIG. 1 or a core network component (e.g., base station 102, 310, 704; or the network entity 1202 in the hardware implementation of FIG. 12). FIGS. 5A, 5B, and 7 illustrate various aspects of the steps in connection with flowchart 900. For example, referring to FIG. 7, the UE 702 may receive, at 706, from a network entity (base station 704), a CSI report configuration including a set of sub-configurations. Each sub-configuration in the set of sub-configurations corresponds to a transmission setting associated with a CSI-RS. In some aspects, 902 may be performed by the CSI configuration component 198.

At 906, the UE may determine one or more CSIs respectively corresponding to a subset of the set of sub-configurations. For example, referring to FIG. 7, the UE 702 may determine, at 710, one or more CSIs respectively corresponding to a subset of the set of sub-configurations. In some aspects, 906 may be performed by the CSI configuration component 198.

At 914, the UE may transmit, based on the transmission setting corresponding to a first sub-configuration of the subset of sub-configurations, a reduced content of a CSI report. The CSI report may be associated with a first CSI for the first sub-configuration of the set of sub-configurations. For example, referring to FIG. 7, the UE 702 may transmit, at 720, based on the transmission setting corresponding to a first sub-configuration of the subset of sub-configurations, a reduced content of a CSI report. The CSI report may be associated with a first CSI for the first sub-configuration of the set of sub-configurations. In some aspects, 914 may be performed by the CSI configuration component 198.

Alternatively, at 916, the UE may refrain, based on the transmission setting corresponding to a first sub-configuration of the subset of sub-configurations, from transmitting the CSI report. The CSI report may be associated with a first CSI for the first sub-configuration. For example, referring to FIG. 7, the UE 702 may refrain, at 712, 714, or 716, based on the transmission setting (e.g., the number of CSI-RS antenna ports, the power offset, or a reduction condition) corresponding to a first sub-configuration of the subset of sub-configurations, from transmitting the CSI report. The CSI report may be associated with a first CSI for the first sub-configuration. In some aspects, 916 may be performed by the CSI configuration component 198.

In some aspects, the transmission setting corresponding to the first sub-configuration may include one or more: the number of CSI-RS antenna ports for the first sub-configuration or the power offset associated with a PDSCH for the first sub-configuration. For example, referring to FIG. 7, the transmission setting corresponding to the first sub-configuration may include one or more: the number of CSI-RS antenna ports for the first sub-configuration (e.g., at 712), or the power offset associated with a PDSCH for the first sub-configuration (e.g., at 714). For example, referring to FIG. 5A and FIG. 5B, the transmission setting corresponding to one sub-configuration may include the number of CSI-RS antenna ports (e.g., antenna ports 512, 514, 516, and 518, or antenna ports 562, 564, 566, and 568) associated with the sub-configuration.

In some aspects, at 904, the UE may determine, based on first configuration parameters and second configuration parameters in each sub-configuration of the subset of sub-configurations, the number of CSI-RS antenna ports for each sub-configuration of the subset of sub-configurations. For example, referring to FIG. 7, the UE 702 may determine, at 708, based on first configuration parameters and second configuration parameters in each sub-configuration of the subset of sub-configurations, the number of CSI-RS antenna ports for each sub-configuration of the subset of sub-configurations. In some aspects, 904 may be performed by the CSI configuration component 198.

In some aspects, the transmission setting may include the number of CSI-RS antenna ports for the first sub-configuration. To refrain from transmitting the CSI report (at 916), the UE may refrain from transmitting the CSI report, at 916, in response to the first sub-configuration having a first number of CSI-RS antenna ports less than a second number of CSI-RS antenna ports of a second sub-configuration of the subset of sub-configuration (at 908), where the second sub-configuration has a rank of one. For example, referring to FIG. 7, the UE may, at 712, refrain from transmitting the CSI report corresponding to a first sub-configuration in response to the first sub-configuration having a first number of CSI-RS antenna ports less than a second number of CSI-RS antenna ports of a second sub-configuration of the subset of sub-configuration, where the second sub-configuration has a rank of one.

In some aspects, the transmission setting includes the number of CSI-RS antenna ports for the first sub-configuration. To transmit the reduced content of the CSI report (at 914), the UE may transmit the reduced content of the CSI report (at 914) in response to the first sub-configuration having a first number of CSI-RS antenna ports less than a second number of CSI-RS antenna ports of a second sub-configuration of the subset of sub-configurations (at 908), where the second sub-configuration has a rank of one. The reduced content of the CSI report may include a subset of CSI parameters of the CSI report. For example, referring to FIG. 7, the UE may, at 720, transmit the reduced content of the CSI report in response to the first sub-configuration having a first number of CSI-RS antenna ports less than a second number of CSI-RS antenna ports of a second sub-configuration of the subset of sub-configurations. The second sub-configuration has a rank of one, and the reduced content of the CSI report may include a subset of CSI parameters of the CSI report.

In some aspects, the subset of CSI parameters of the CSI report may exclude the RI. For example, referring to FIG. 7, the subset of CSI parameters of the CSI report (which the UE 702 transmits at 720) may exclude the RI.

In some aspects, the subset of CSI parameters of the CSI report may include one or more parameters of part 1 CSI. For example, referring to FIG. 7, the subset of CSI parameters of the CSI report (which the UE 702 transmits at 720) may include one or more parameters of part 1 CSI.

In some aspects, the one or more parameters of the part 1 CSI may include one or more of: the CRI or the CQI. For example, referring to FIG. 7, the one or more parameters of the part 1 CSI (which the UE 702 transmits at 720) may include one or more of: the CRI or the CQI.

In some aspects, the power offset may include one of: the power offset between the PDSCH and the CSI-RS, or the power offset between the CSI-RS and the SSB. For example, referring to FIG. 7, the power offset (e.g., the first power offset and the second power offset at 714) may include one of: the power offset between the PDSCH and the CSI-RS, or the power offset between the CSI-RS and the SSB.

In some aspects, the transmission setting may include the power offset. To refrain from transmitting the CSI report (at 916), the UE may refrain from transmitting the CSI report (at 916) in response to the first sub-configuration having a first power offset less than a second power offset of a second sub-configuration of the subset of sub-configurations (at 912), where the second sub-configuration has a rank of one. For example, referring to FIG. 7, the UE 702 may, at 714, refrain from transmitting the CSI report corresponding to the first sub-configuration in response to the first sub-configuration having a first power offset less than a second power offset of a second sub-configuration of the subset of sub-configurations, where the second sub-configuration has a rank of one.

In some aspects, the transmission setting may include the power offset. To transmit the reduced content of the CSI report (at 914), the UE may transmit the reduced content of the CSI report (at 914) in response to the first sub-configuration having a first power offset less than a second power offset of a second sub-configuration of the subset of sub-configurations (at 912), where the second sub-configuration has a rank of one. The reduced content of the CSI report may include a subset of CSI parameters of the CSI report. For example, referring to FIG. 7, the UE 702 may, at 720, transmit the reduced content of the CSI report in response to the first sub-configuration having a first power offset less than a second power offset of a second sub-configuration of the subset of sub-configurations, where the second sub-configuration has a rank of one.

In some aspects, the transmission setting corresponding to the first sub-configuration may include the number of CSI-RS antenna ports and the power offset. To transmit the reduced content of the CSI report (at 914) or to refrain from transmitting the CSI report (at 916), the UE may transmit the reduced content of the CSI report (at 914) or to refrain from transmitting the CSI report (at 916) in response to a reduction condition being met (at 910). For example, referring to FIG. 7, the UE 702 may, at 716, refrain from transmitting the CSI report associated with the first CSI for the first sub-configuration in response to a reduction condition being met. At 720, the UE 702 may transmit a reduced content of the CSI report in response to the reduction condition being met.

In some aspects, the reduction condition may include: a first number of CSI-RS antenna ports being equal to a second number of CSI-RS antenna ports associated with a second sub-configuration of the subset of sub-configurations, and a first power offset between the PDSCH and the CSI-RS associated with the first sub-configuration being smaller than a second power offset between the PDSCH and the CSI-RS associated with the second sub-configuration, where the second sub-configuration has a rank of one. For example, referring to FIG. 7, the reduction condition (e.g., at 716) may include: a first number of CSI-RS antenna ports being equal to a second number of CSI-RS antenna ports associated with a second sub-configuration of the subset of sub-configurations, and a first power offset between the PDSCH and the CSI-RS associated with the first sub-configuration being smaller than a second power offset between the PDSCH and the CSI-RS associated with the second sub-configuration, where the second sub-configuration has a rank of one.

In some aspects, the reduction condition may include: a first number of CSI-RS antenna ports being less than a second number of CSI-RS antenna ports associated with a second sub-configuration of the subset of sub-configurations, and a first power offset between the PDSCH and the CSI-RS associated with the first sub-configuration being equal to a second power offset between the PDSCH and the CSI-RS associated with the second sub-configuration, where the second sub-configuration has a rank of one. For example, referring to FIG. 7, the reduction condition (e.g., at 716) may include a first number of CSI-RS antenna ports being less than a second number of CSI-RS antenna ports associated with a second sub-configuration of the subset of sub-configurations, and a first power offset between the PDSCH and the CSI-RS associated with the first sub-configuration being equal to a second power offset between the PDSCH and the CSI-RS associated with the second sub-configuration, where the second sub-configuration has a rank of one.

FIG. 10 is a flowchart 1000 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The methods allow the UE to refrain from reporting CSI parameters or selectively report CSI parameters based on the rank and the parameters of the sub-configurations, such as the number of CSI-RS antenna ports or power configurations. The methods reduce the overhead associated with the CSI reports and enhance the efficiency of wireless communication.

As shown in FIG. 10, at 1002, the network entity may transmit, to a UE, a CSI report configuration including a set of sub-configurations. Each sub-configuration in the set of sub-configurations may correspond to a transmission setting associated with a CSI-RS. The UE may be the UE 104, 350, 702, or the apparatus 1204 in the hardware implementation of FIG. 12. FIGS. 5A, 5B, and 7 illustrate various aspects of the steps in connection with flowchart 1000. For example, referring to FIG. 7, the network entity (base station 704) may transmit, at 706, to the UE 702, a CSI report configuration including a set of sub-configurations. Each sub-configuration in the set of sub-configurations may correspond to a transmission setting associated with a CSI-RS. In some aspects, 1002 may be performed by the CSI configuration component 199.

At 1004, the network entity may receive, based on the transmission setting corresponding to a first sub-configuration of the set of sub-configurations, a CSI report with a reduced content. The CSI report may be associated with a first CSI for the first sub-configuration. For example, referring to FIG. 7, the network entity (base station 704) may receive, at 720, based on the transmission setting corresponding to a first sub-configuration of the set of sub-configurations, a CSI report with a reduced content. The CSI report may be associated with a first CSI for the first sub-configuration. In some aspects, 1004 may be performed by the CSI configuration component 199.

Alternatively, at 1006, the network entity may refrain, based on the transmission setting corresponding to a first sub-configuration of the set of sub-configurations, from receiving a CSI report. The CSI report may be associated with the first CSI for the first sub-configuration. For example, referring to FIG. 7, the network entity (base station 704) may refrain, at 718, based on the transmission setting corresponding to a first sub-configuration of the set of sub-configurations, from receiving a CSI report. The CSI report may be associated with the first CSI for the first sub-configuration. In some aspects, 806 may be performed by the CSI configuration component 199.

FIG. 11 is a flowchart 1100 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 704; or the network entity 1202 in the hardware implementation of FIG. 12). The methods allow the UE to refrain from reporting CSI parameters or selectively report CSI parameters based on the rank and the parameters of the sub-configurations, such as the number of CSI-RS antenna ports or power configurations. The methods reduce the overhead associated with the CSI reports and enhance the efficiency of wireless communication.

As shown in FIG. 11, at 1102, the network entity may transmit, to a UE, a CSI report configuration including a set of sub-configurations. Each sub-configuration in the set of sub-configurations may correspond to a transmission setting associated with a CSI-RS. The UE may be the UE 104, 350, 702, or the apparatus 1204 in the hardware implementation of FIG. 12. FIGS. 5A, 5B, and 7 illustrate various aspects of the steps in connection with flowchart 1100. For example, referring to FIG. 7, the network entity (base station 704) may transmit, at 706, to the UE 702, a CSI report configuration including a set of sub-configurations. Each sub-configuration in the set of sub-configurations may correspond to a transmission setting associated with a CSI-RS. In some aspects, 1102 may be performed by the CSI configuration component 199.

At 1110, the network entity may receive, based on the transmission setting corresponding to a first sub-configuration of the set of sub-configurations, a CSI report with a reduced content. The CSI report may be associated with a first CSI for the first sub-configuration. For example, referring to FIG. 7, the network entity (base station 704) may receive, at 720, based on the transmission setting corresponding to a first sub-configuration of the set of sub-configurations, a CSI report with a reduced content. The CSI report may be associated with a first CSI for the first sub-configuration. In some aspects, 1110 may be performed by the CSI configuration component 199.

Alternatively, at 1112, the network entity may refrain, based on the transmission setting corresponding to a first sub-configuration of the set of sub-configurations, from receiving a CSI report. The CSI report may be associated with the first CSI for the first sub-configuration. For example, referring to FIG. 7, the network entity (base station 704) may refrain, at 718, based on the transmission setting corresponding to a first sub-configuration of the set of sub-configurations, from receiving a CSI report. The CSI report may be associated with the first CSI for the first sub-configuration. In some aspects, 1112 may be performed by the CSI configuration component 199.

In some aspects, the transmission setting corresponding to the first sub-configuration may include one or more: the number of CSI-RS antenna ports for the first sub-configuration or the power offset associated with a PDSCH for the first sub-configuration. For example, referring to FIG. 7, the transmission setting corresponding to the first sub-configuration may include one or more: the number of CSI-RS antenna ports for the first sub-configuration (e.g., at 712), or the power offset associated with a PDSCH for the first sub-configuration (e.g., at 714). For example, referring to FIG. 5A and FIG. 5B, the transmission setting corresponding to one sub-configuration may include the number of CSI-RS antenna ports (e.g., antenna ports 512, 514, 516, and 518, or antenna ports 562, 564, 566, and 568) associated with the sub-configuration.

In some aspects, the transmission setting may include the number of CSI-RS antenna ports for the first sub-configuration, and, to refrain from receiving the CSI report (at 1112), the network entity may refrain from receiving the CSI report (at 1112) in response to the first sub-configuration having a first number of CSI-RS antenna ports less than a second number of CSI-RS antenna ports of a second sub-configuration of the set of sub-configurations (at 1104), where the second sub-configuration has a rank of one. For example, referring to FIG. 7, the network entity (base station 704) may, at 718, refrain from receiving the CSI report in response to the first sub-configuration having a first number of CSI-RS antenna ports less than a second number of CSI-RS antenna ports of a second sub-configuration of the set of sub-configurations, where the second sub-configuration has a rank of one.

In some aspects, the transmission setting may include the number of CSI-RS antenna ports for the first sub-configuration, and, to receive the CSI report with the reduced content (at 1110), the network entity may receive the CSI report with the reduced content (at 1110) in response to the first sub-configuration having a first number of CSI-RS antenna ports less than a second number of CSI-RS antenna ports of a second sub-configuration of the set of sub-configurations (at 1104), where the second sub-configuration has a rank of one. The reduced content of the CSI report may include a subset of CSI parameters of the CSI report. For example, referring to FIG. 7, the network entity (base station 704) may, at 720, receive the CSI report with the reduced content if the first sub-configuration has a first number of CSI-RS antenna ports less than a second number of CSI-RS antenna ports of a second sub-configuration of the set of sub-configurations, where the second sub-configuration has a rank of one. The reduced content of the CSI report (at 720) may include a subset of CSI parameters of the CSI report.

In some aspects, the subset of CSI parameters of the CSI report may exclude the RI. For example, referring to FIG. 7, the subset of CSI parameters of the CSI report (which the base station 704 receives at 720) may exclude the RI.

In some aspects, the subset of CSI parameters of the CSI report may include one or more parameters of part 1 CSI. For example, referring to FIG. 7, the subset of CSI parameters of the CSI report (which the base station 704 receives at 720) may include one or more parameters of part 1 CSI.

In some aspects, the one or more parameters of the part 1 CSI may include one or more of: the CRI or the CQI. For example, referring to FIG. 7, the one or more parameters of the part 1 CSI (which the base station 704 receives at 720) may include one or more of: the CRI or the CQI.

In some aspects, the power offset may include one of: the power offset between the PDSCH and the CSI-RS, or the power offset between the CSI-RS and the SSB. For example, referring to FIG. 7, the power offset (e.g., the first power offset and the second power offset at 714) may include one of: the power offset between the PDSCH and the CSI-RS, or the power offset between the CSI-RS and the SSB.

In some aspects, the transmission setting may include the power offset, and, to refrain from receiving the CSI report (at 1112), the network entity may refrain from receiving the CSI report (at 1112) in response to the first sub-configuration having a first power offset less than a second power offset of a second sub-configuration of the set of sub-configurations (at 1108), where the second sub-configuration has a rank of one. The CSI report is associated with the first CSI for the first sub-configuration. For example, referring to FIG. 7, the network entity (base station 704) may, at 718, refrain from receiving the CSI report in response to the first sub-configuration having a first power offset less than a second power offset of a second sub-configuration of the set of sub-configurations. The second sub-configuration has a rank of one. The CSI report is associated with the first CSI for the first sub-configuration.

In some aspects, the transmission setting may include the power offset, and, to receive the CSI report with the reduced content (at 1110), the network entity may receive the CSI report with the reduced content in response to the first sub-configuration having a first power offset less than a second power offset of a second sub-configuration of the set of sub-configurations (at 1108), where the second sub-configuration has a rank of one. The reduced content of the CSI report may include a subset of CSI parameters of the CSI report. For example, referring to FIG. 7, the network entity (base station 704) may receive, at 718, the CSI report with the reduced content in response to the first sub-configuration having a first power offset less than a second power offset of a second sub-configuration of the set of sub-configurations, where the second sub-configuration has a rank of one. The reduced content of the CSI report may include a subset of CSI parameters of the CSI report.

In some aspects, the transmission setting corresponding to the first sub-configuration may include the number of CSI-RS antenna ports and the power offset, and, to receive the CSI report with the reduced content (at 1110) or refrain from receiving the CSI report (at 1112), the network entity may receive the CSI report with the reduced content (at 1110) or refrain from receiving the CSI report (at 1112) in response to a reduction condition being met (at 1106). For example, referring to FIG. 7, the network entity (base station 704) may receive the CSI report with the reduced content (at 720) or refrain from receiving the CSI report (at 718) in response to a reduction condition (at 716) being met.

In some aspects, the reduction condition may include: a first number of CSI-RS antenna ports being equal to a second number of CSI-RS antenna ports associated with a second sub-configuration of the set of sub-configurations, and a first power offset between the PDSCH and the CSI-RS associated with the first sub-configuration being smaller than a second power offset between the PDSCH and the CSI-RS associated with the second sub-configuration, where the second sub-configuration has a rank of one. For example, referring to FIG. 7, the reduction condition (at 716) may include a first number of CSI-RS antenna ports being equal to a second number of CSI-RS antenna ports associated with a second sub-configuration of the set of sub-configurations, and a first power offset between the PDSCH and the CSI-RS associated with the first sub-configuration being smaller than a second power offset between the PDSCH and the CSI-RS associated with the second sub-configuration, where the second sub-configuration has a rank of one.

In some aspects, the reduction condition may include: a first number of CSI-RS antenna ports being less than a second number of CSI-RS antenna ports associated with a second sub-configuration of the set of sub-configurations, and a first power offset between the PDSCH and the CSI-RS associated with the first sub-configuration being equal to a second power offset between the PDSCH and the CSI-RS associated with the second sub-configuration, where the second sub-configuration has a rank of one. For example, referring to FIG. 7, the reduction condition (at 716) may include: a first number of CSI-RS antenna ports being less than a second number of CSI-RS antenna ports associated with a second sub-configuration of the set of sub-configurations, and a first power offset between the PDSCH and the CSI-RS associated with the first sub-configuration being equal to a second power offset between the PDSCH and the CSI-RS associated with the second sub-configuration, where the second sub-configuration has a rank of one.

Figure 12:
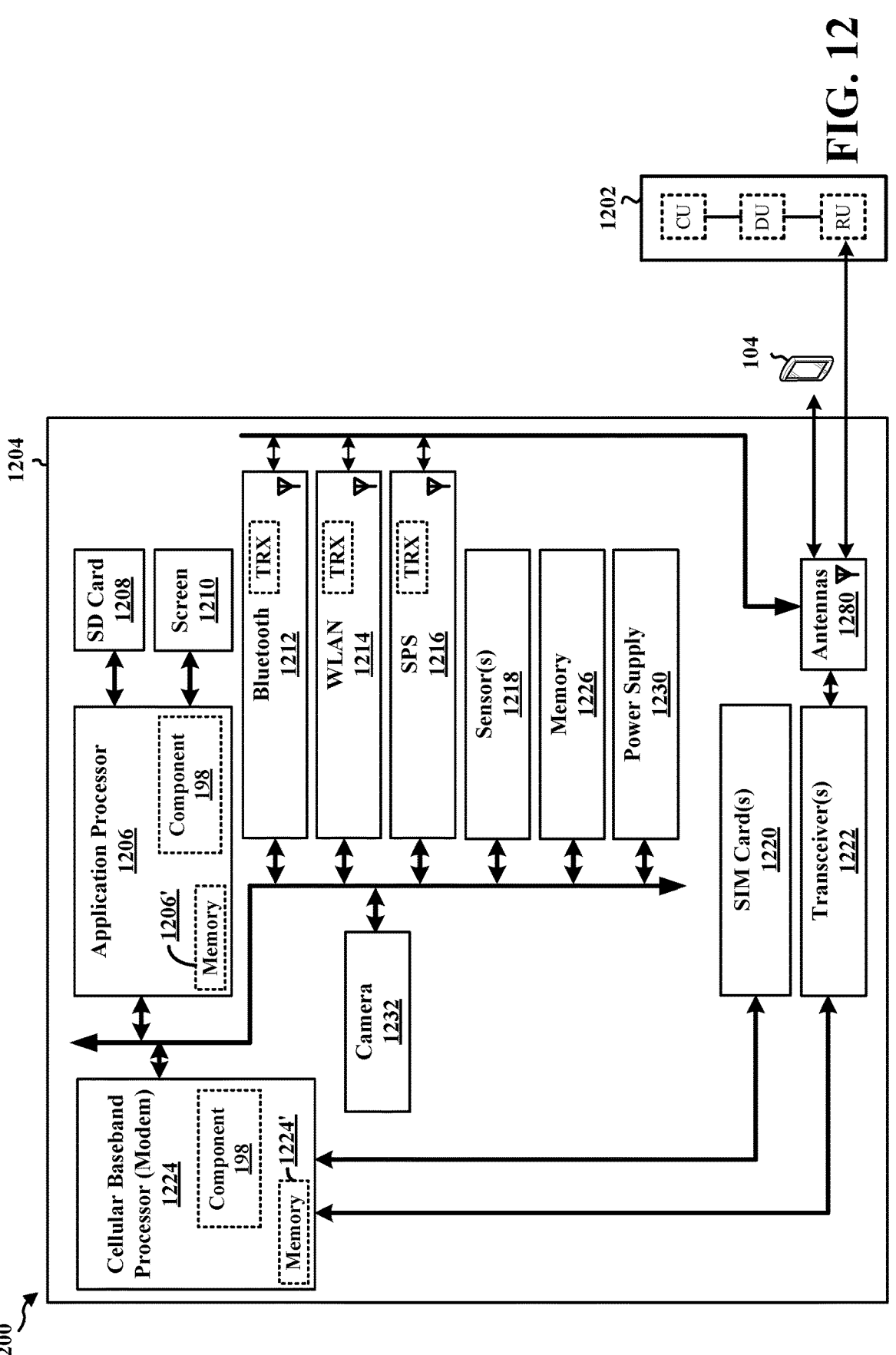
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include at least one cellular baseband processor 1224 (also referred to as a modem) coupled to one or more transceivers 1222 (e.g., cellular RF transceiver). The cellular baseband processor(s) 1224 may include at least one on-chip memory 1224'. In some aspects, the apparatus 1204 may further include one or more subscriber identity modules (SIM) cards 1220 and at least one application processor 1206 coupled to a secure digital (SD) card 1208 and a screen 1210. The application processor(s) 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, just a receiver (RX)). The Bluetooth module 1212, the WLAN module 1214, and the SPS module 1216 may include their own dedicated antennas and/or utilize the antennas 1280 for communication. The cellular baseband processor(s) 1224 communicates through the transceiver(s) 1222 via one or more antennas 1280 with the UE 104 and/or with an RU associated with a network entity 1202. The cellular baseband processor(s) 1224 and the application processor(s) 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor(s) 1224 and the application processor(s) 1206 are each responsible for general processing, including the execution of software stored on the computer-readable medium/memory. The software, when executed by the cellular baseband processor(s) 1224/application processor(s) 1206, causes the cellular baseband processor(s) 1224/application processor(s) 1206 to perform the various functions described supra. The cellular baseband processor(s) 1224 and the application processor(s) 1206 are configured to perform the various functions described supra based at least in part of the information stored in the memory. That is, the cellular baseband processor(s) 1224 and the application processor(s) 1206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1224/application processor(s) 1206 when executing software. The cellular baseband processor(s) 1224/application processor(s) 1206 may be a component of the UE 350 and may include the at least one memory 360 and/or at least one of the TX processor 368, the RX processor 356, and the controller/processor 359. In one configuration, the apparatus 1204 may be at least one processor chip (modem and/or application) and include just the cellular baseband processor(s) 1224 and/or the application processor(s) 1206, and in another configuration, the apparatus 1204 may be the entire UE (e.g., see UE 350 of FIG. 3) and include the additional modules of the apparatus 1204.

As discussed supra, the component 198 may be configured to receive, from a network entity, a CSI report configuration including a set of sub-configurations, where each sub-configuration in the set of sub-configurations corresponds to a transmission setting associated with a CSI-RS; determine one or more CSIs respectively corresponding to a subset of the set of sub-configurations; and transmit, based on the transmission setting corresponding to a first sub-configuration of the subset of sub-configurations, a reduced content of a CSI report or refrain from transmitting the CSI report. The CSI report may be associated with a first CSI for the first sub-configuration. The component 198 may be further configured to perform any of the aspects described in connection with the flowcharts in FIG. 8 and FIG. 9, and/or performed by the UE 702 in FIG. 7. The component 198 may be within the cellular baseband processor(s) 1224, the application processor(s) 1206, or both the cellular baseband processor(s) 1224 and the application processor(s) 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1204 may include a variety of components configured for various functions. In one configuration, the apparatus 1204, and in particular the cellular baseband processor(s) 1224 and/or the application processor(s) 1206, includes means for receiving, from a network entity, a CSI report configuration including a set of sub-configurations, where each sub-configuration in the set of sub-configurations corresponds to a transmission setting associated with a CSI-RS, means for determining one or more CSIs respectively corresponding to a subset of the set of sub-configurations, and means for transmitting, based on the transmission setting corresponding to a first sub-configuration of the subset of sub-configurations, a reduced content of a CSI report or means for refraining from transmitting the CSI report. The apparatus 1204 may further include means for performing any of the aspects described in connection with the flowcharts in FIG. 8 and FIG. 9, and/or aspects performed by the UE 702 in FIG. 7. The means may be the component 198 of the apparatus 1204 configured to perform the functions recited by the means. As described supra, the apparatus 1204 may include the TX processor 368, the RX processor 356, and the controller/processor 359. As such, in one configuration, the means may be the TX processor 368, the RX processor 356, and/or the controller/processor 359 configured to perform the functions recited by the means.

Figure 13:
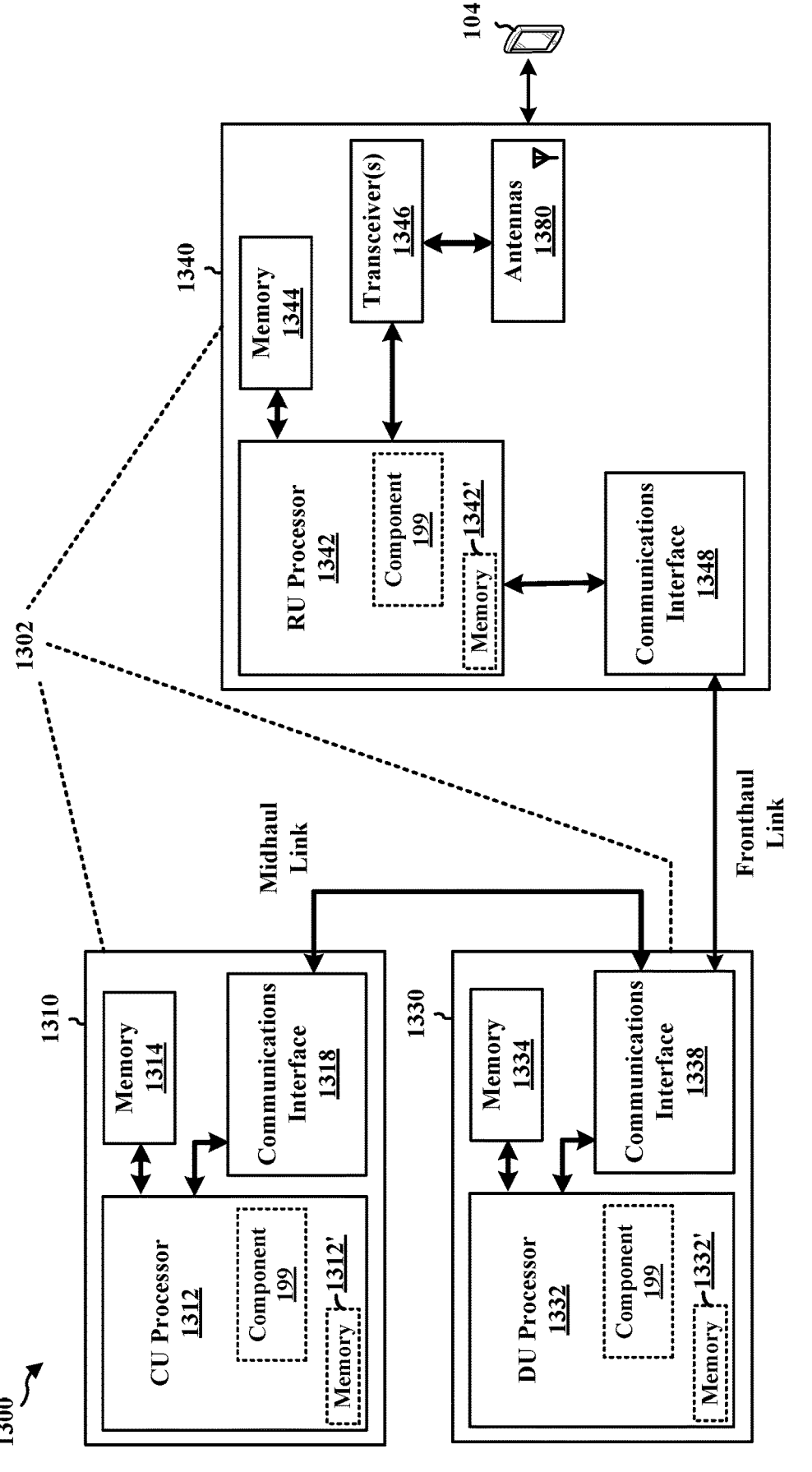
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include at least one CU processor 1312. The CU processor(s) 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include at least one DU processor 1332. The DU processor(s) 1332 may include on-chip memory 1332'. In some aspects, the DU 1330 may further include additional memory modules 1334 and a communications interface 1338. The DU 1330 communicates with the RU 1340 through a fronthaul link. The RU 1340 may include at least one RU processor 1342. The RU processor(s) 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit, to a UE, a CSI report configuration including a set of sub-configurations, where each sub-configuration in the set of sub-configurations corresponds to a transmission setting associated with a CSI-RS; and receive, based on the transmission setting corresponding to a first sub-configuration of the set of sub-configurations, the CSI report with a reduced content or refrain from receiving the CSI report, where the CSI report is associated with a first CSI for the first sub-configuration. The component 199 may be further configured to perform any of the aspects described in connection with the flowcharts in FIG. 10 and FIG. 11, and/or performed by the base station 704 in FIG. 7. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1302 may include a variety of components configured for various functions. In one configuration, the network entity 1302 includes means for transmitting, to a UE, a CSI report configuration including a set of sub-configurations, where each sub-configuration in the set of sub-configurations corresponds to a transmission setting associated with a CSI-RS, and means for receiving, based on the transmission setting corresponding to a first sub-configuration of the set of sub-configurations, the CSI report with a reduced content or means for refraining from receiving the CSI report, where the CSI report is associated with a first CSI for the first sub-configuration. The network entity 1302 may further include means for performing any of the aspects described in connection with the flowcharts in FIG. 10 and FIG. 11, and/or aspects performed by the base station 704 in FIG. 7. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include receiving, from a network entity, a CSI report configuration including a set of sub-configurations, where each sub-configuration in the set of sub-configurations corresponds to a transmission setting associated with a CSI-RS; determining one or more CSIs respectively corresponding to a subset of the set of sub-configurations; and transmitting, based on the transmission setting corresponding a first sub-configuration of the subset of sub-configurations, a reduced content of a CSI report or refraining from transmitting the CSI report. The methods allow the UE to refrain from reporting CSI parameters or selectively report CSI parameters based on the rank and the parameters of the sub-configurations, such as the number of CSI-RS antenna ports or power configurations. The methods reduce the overhead associated with the CSI reports and enhance the efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include receiving, from a network entity, a channel state information (CSI) report configuration comprising a set of sub-configurations, wherein each sub-configuration in the set of sub-configurations corresponds to a transmission setting associated with a channel state information reference signal (CSI-RS); determining one or more CSIs respectively corresponding to a subset of the set of sub-configurations; and transmitting, based on the transmission setting corresponding a first sub-configuration of the subset of sub-configurations, a reduced content of a CSI report or refraining from transmitting the CSI report, wherein the CSI report is associated with a first CSI for the first sub-configuration.

Aspect 2 is the method of aspect 1, wherein the transmission setting corresponding to the first sub-configuration may include one or more: a number of CSI-RS antenna ports for the first sub-configuration or a power offset associated with a physical downlink shared channel (PDSCH) for the first sub-configuration.

Aspect 3 is the method of any of aspects 1 to 2, wherein the method may further include determining, based on first configuration parameters and second configuration parameters in each sub-configuration of the subset of sub-configurations, the number of CSI-RS antenna ports for each sub-configuration of the subset of sub-configurations.

Aspect 4 is the method of aspect 3, wherein the transmission setting may include the number of CSI-RS antenna ports for the first sub-configuration, and wherein refraining from transmitting the CSI report comprises: refraining from transmitting the CSI report in response to the first sub-configuration having a first number of CSI-RS antenna ports less than a second number of CSI-RS antenna ports of a second sub-configuration of the subset of sub-configuration, wherein the second sub-configuration has a rank of one.

Aspect 5 is the method of aspect 3, wherein the transmission setting may include the number of CSI-RS antenna ports for the first sub-configuration, and wherein transmitting the reduced content of the CSI report comprises: transmitting the reduced content of the CSI report in response to the first sub-configuration having a first number of CSI-RS antenna ports less than a second number of CSI-RS antenna ports of a second sub-configuration of the subset of sub-configurations, wherein the second sub-configuration has a rank of one, and wherein the reduced content of the CSI report includes a subset of CSI parameters of the CSI report.

Aspect 6 is the method of aspect 5, wherein the subset of CSI parameters of the CSI report may exclude a rank indicator (RI).

Aspect 7 is the method of any of aspects 5 to 6, wherein the subset of CSI parameters of the CSI report may include one or more parameters of part 1 CSI.

Aspect 8 is the method of aspect 7, wherein the one or more parameters of the part 1 CSI may include one or more of: a channel rank indicator (CRI) or a channel quality indicator (CQI).

Aspect 9 is the method of any of aspects 2 to 8, wherein the power offset may be between the PDSCH and the CSI-RS, or between the CSI-RS and the synchronization signal block (SSB).

Aspect 10 is the method of aspect 9, wherein the transmission setting may include the power offset, and wherein refraining from transmitting the CSI report comprises: refraining from transmitting the CSI report in response to the first sub-configuration having a first power offset less than a second power offset of a second sub-configuration of the subset of sub-configurations, wherein the second sub-configuration has a rank of one.

Aspect 11 is the method of aspect 9, wherein the transmission setting may include the power offset, and wherein transmitting the reduced content of the CSI report comprises: transmitting the reduced content of the CSI report in response to the first sub-configuration having a first power offset less than a second power offset of a second sub-configuration of the subset of sub-configurations, wherein the second sub-configuration has a rank of one, and wherein the reduced content of the CSI report includes a subset of CSI parameters of the CSI report.

Aspect 12 is the method of aspect 9, wherein the transmission setting corresponding to the first sub-configuration may include the number of CSI-RS antenna ports and the power offset, and wherein transmitting the reduced content of the CSI report or refraining from transmitting the CSI report comprises: transmitting, in response to a reduction condition being met, the reduced content of the CSI report, wherein the reduced content of the CSI report includes a subset of CSI parameters of the CSI report; or refraining from transmitting, in response to the reduction condition being met, the CSI report associated with the first CSI for the first sub-configuration.

Aspect 13 is the method of aspect 12, wherein the reduction condition may include: a first number of CSI-RS antenna ports being equal to a second number of CSI-RS antenna ports associated with a second sub-configuration of the subset of sub-configurations, and a first power offset between the PDSCH and the CSI-RS associated with the first sub-configuration being smaller than a second power offset between the PDSCH and the CSI-RS associated with the second sub-configuration, wherein the second sub-configuration has a rank of one.

Aspect 14 is the method of aspect 12, wherein the reduction condition may include: a first number of CSI-RS antenna ports being less than a second number of CSI-RS antenna ports associated with a second sub-configuration of the subset of sub-configurations, and a first power offset between the PDSCH and the CSI-RS associated with the first sub-configuration being equal to a second power offset between the PDSCH and the CSI-RS associated with the second sub-configuration, wherein the second sub-configuration has a rank of one.

Aspect 15 is an apparatus for wireless communication at a UE, comprising: at least one memory; and at least one processor coupled to the at least one memory and, based at least in part on information stored in the at least one memory, the at least one processor, individually or in any combination, is configured to perform the method of any of aspects 1-14.

Aspect 16 is the apparatus for wireless communication at a UE, comprising means for performing each step in the method of any of aspects 1-14.

Aspect 17 is an apparatus of any of aspects 15-16, further comprising a transceiver configured to receive or to transmit in association with the method of any of aspects 1-14.

Aspect 18 is a computer-readable medium (e.g., a non-transitory computer-readable medium) storing computer executable code at a UE, the code when executed by at least one processor causes the at least one processor to, individually or in any combination, perform the method of any of aspects 1-14.

Aspect 19 is a method of wireless communication at a network entity. The method may include transmitting, to a user equipment (UE), a channel state information (CSI) report configuration comprising a set of sub-configurations, wherein each sub-configuration in the set of sub-configurations corresponds to a transmission setting associated with a channel state information reference signal (CSI-RS); and receiving, based on the transmission setting corresponding to a first sub-configuration of the set of sub-configurations, the CSI report with a reduced content or refraining from receiving a CSI report (e.g., skipping receiving a CSI report), wherein the CSI report is associated with a first CSI for the first sub-configuration.

Aspect 20 is the method of aspect 19, wherein the transmission setting corresponding to the first sub-configuration may include one or more: a number of CSI-RS antenna ports for the first sub-configuration or a power offset associated with a physical downlink shared channel (PDSCH) for the first sub-configuration.

Aspect 21 is the method of any of aspects 19 to 20, wherein the transmission setting may include the number of CSI-RS antenna ports for the first sub-configuration, and wherein refraining from receiving the CSI report comprises: refraining from receiving the CSI report in response to the first sub-configuration having a first number of CSI-RS antenna ports less than a second number of CSI-RS antenna ports of a second sub-configuration of the set of sub-configurations, wherein the second sub-configuration has a rank of one.

Aspect 22 is the method of any of aspects 19 to 20, wherein the transmission setting may include the number of CSI-RS antenna ports for the first sub-configuration, and wherein receiving the CSI report with the reduced content comprises: receiving the CSI report with the reduced content in response to the first sub-configuration having a first number of CSI-RS antenna ports less than a second number of CSI-RS antenna ports of a second sub-configuration of the set of sub-configurations, wherein the second sub-configuration has a rank of one, and wherein the reduced content of the CSI report includes a subset of CSI parameters of the CSI report.

Aspect 23 is the method of aspect 22, wherein the subset of CSI parameters of the CSI report may exclude a rank indicator (RI).

Aspect 24 is the method of any of aspects 22 to 23, wherein the subset of CSI parameters of the CSI report may include one or more parameters of part 1 CSI.

Aspect 25 is the method of aspect 24, wherein the one or more parameters of the part 1 CSI may include one or more of: a channel rank indicator (CRI) or a channel quality indicator (CQI).

Aspect 26 is the method of any of aspects 20 to 25, wherein the power offset may be between the PDSCH and the CSI-RS, or between the CSI-RS and the synchronization signal block (SSB).

Aspect 27 is the method of aspect 26, wherein the transmission setting may include the power offset, and wherein refraining from receiving the CSI report comprises: refraining from receiving the CSI report in response to the first sub-configuration having a first power offset less than a second power offset of a second sub-configuration of the set of sub-configurations, wherein the second sub-configuration has a rank of one.

Aspect 28 is the method of aspect 26, wherein the transmission setting may include the power offset, and wherein receiving the CSI report with the reduced content comprises: receiving the CSI report with the reduced content in response to the first sub-configuration having a first power offset less than a second power offset of a second sub-configuration of the set of sub-configurations, wherein the second sub-configuration has a rank of one, and wherein the reduced content of the CSI report includes a subset of CSI parameters of the CSI report.

Aspect 29 is the method of aspect 26, wherein the transmission setting corresponding to the first sub-configuration may include the number of CSI-RS antenna ports and the power offset, and wherein receiving the CSI report with the reduced content or refraining from receiving the CSI report comprises: receiving the CSI report with the reduced content or refraining from receiving the CSI report in response to a reduction condition being met.

Aspect 30 is the method of aspect 29, wherein the reduction condition may include: a first number of CSI-RS antenna ports being equal to a second number of CSI-RS antenna ports associated with a second sub-configuration of the set of sub-configurations, and a first power offset between the PDSCH and the CSI-RS associated with the first sub-configuration being smaller than a second power offset between the PDSCH and the CSI-RS associated with the second sub-configuration, wherein the second sub-configuration has a rank of one.

Aspect 31 is the method of aspect 29, wherein the reduction condition may include: a first number of CSI-RS antenna ports being less than a second number of CSI-RS antenna ports associated with a second sub-configuration of the set of sub-configurations, and a first power offset between the PDSCH and the CSI-RS associated with the first sub-configuration being equal to a second power offset between the PDSCH and the CSI-RS associated with the second sub-configuration, wherein the second sub-configuration has a rank of one.

Aspect 32 is an apparatus for wireless communication at a network entity, comprising: at least one memory; and at least one processor coupled to the at least one memory and, based at least in part on information stored in the at least one memory, the at least one processor, individually or in any combination, is configured to perform the method of any of aspects 19-31.

Aspect 33 is the apparatus for wireless communication at a network entity, comprising means for performing each step in the method of any of aspects 19-31.

Aspect 34 is an apparatus of any of aspects 32-33, further comprising a transceiver configured to receive or to transmit in association with the method of any of aspects 19-31.

Aspect 35 is a computer-readable medium (e.g., a non-transitory computer-readable medium) storing computer executable code at a network entity, the code when executed by at least one processor causes the at least one processor to, individually or in any combination, perform the method of any of aspects 19-31.

What is claimed is:

1. An apparatus for wireless communication at a user equipment (UE), comprising:
at least one memory; and
at least one processor coupled to the at least one memory and, based at least in part on information stored in the at least one memory, the at least one processor is configured to:
receive, from a network entity, a channel state information (CSI) report configuration comprising a set of sub-configurations, wherein each sub-configuration in the set of sub-configurations corresponds to a transmission setting associated with a channel state information reference signal (CSI-RS);
determine one or more CSIs respectively corresponding to a subset of the set of sub-configurations; and
transmit, based on the transmission setting corresponding to a first sub-configuration of the subset of sub-configurations, and in response to a reduction condition being met, a reduced content of a CSI report or refrain from transmitting the CSI report, wherein the CSI report is associated with a first CSI for the first sub-configuration, wherein the reduced content of the CSI report includes a subset of CSI parameters of the CSI report, and wherein the subset of CSI parameters of the CSI report excludes a rank indicator (RI), wherein the reduction condition includes:
a first number of CSI-RS antenna ports being less than or equal to a second number of CSI-RS antenna ports associated with a second sub-configuration of the subset of sub-configurations, and
a first power offset between a physical downlink shared channel (PDSCH) and the CSI-RS associated with the first sub-configuration being smaller than or equal to a second power offset between the PDSCH and the CSI-RS associated with the second sub-configuration, wherein the second sub-configuration has a rank of one.

2. The apparatus of claim 1, further comprising a transceiver coupled to the at least one processor, wherein, to receive the CSI report configuration, the at least one processor is configured to receive the CSI report configuration via the transceiver, and wherein the transmission setting corresponding to the first sub-configuration includes one or more:
a number of CSI-RS antenna ports for the first sub-configuration, or
a power offset associated with the PDSCH for the first sub-configuration.

3. The apparatus of claim 2, wherein the at least one processor is further configured to:
determine, based on first configuration parameters and second configuration parameters in each sub-configuration of the subset of sub-configurations, the number of CSI-RS antenna ports for each sub-configuration of the subset of sub-configurations.

4. The apparatus of claim 3, wherein the transmission setting includes the number of CSI-RS antenna ports for the first sub-configuration, and wherein, to refrain from transmitting the CSI report, the at least one processor is configured to:
refrain from transmitting the CSI report in response to the first sub-configuration having the first number of CSI-RS antenna ports less than the second number of CSI-RS antenna ports of the second sub-configuration of the subset of sub-configuration.

5. The apparatus of claim 3, wherein the transmission setting includes the number of CSI-RS antenna ports for the first sub-configuration, and wherein, to transmit the reduced content of the CSI report, the at least one processor is configured to:
transmit the reduced content of the CSI report in response to the first sub-configuration having the first number of CSI-RS antenna ports less than the second number of CSI-RS antenna ports of the second sub-configuration of the subset of sub-configurations.

6. The apparatus of claim 5, wherein the subset of CSI parameters of the CSI report includes one or more parameters of part 1 CSI.

7. The apparatus of claim 6, wherein the one or more parameters of the part 1 CSI include one or more of: a channel rank indicator (CRI) or a channel quality indicator (CQI).

8. The apparatus of claim 2, wherein the power offset is between the PDSCH and the CSI-RS, or between the CSI-RS and a synchronization signal block (SSB).

9. The apparatus of claim 8, wherein the transmission setting includes the power offset, and wherein, to refrain from transmitting the CSI report, the at least one processor is configured to:
refrain from transmitting the CSI report in response to the first sub-configuration having the first power offset less than second power offset of the second sub-configuration of the subset of sub-configurations.

10. The apparatus of claim 8, wherein the transmission setting includes the power offset, and wherein, to transmit the reduced content of the CSI report, the at least one processor is configured to:
transmit the reduced content of the CSI report in response to the first sub-configuration having the first power offset less than the second power offset of the second sub-configuration of the subset of sub-configurations, and wherein the reduced content of the CSI report includes the subset of CSI parameters of the CSI report.

11. The apparatus of claim 8, wherein the transmission setting corresponding to the first sub-configuration includes the number of CSI-RS antenna ports and the power offset, and wherein to refrain from transmitting the CSI report, the at least one processor is configured to:

refrain from transmitting, in response to the reduction condition being met, the CSI report associated with the first CSI for the first sub-configuration.

12. The apparatus of claim 11, wherein the reduction condition includes:

the first number of CSI-RS antenna ports being equal to the second number of CSI-RS antenna ports associated with the second sub-configuration of the subset of sub-configurations, and the first power offset between the PDSCH and the CSI-RS associated with the first sub-configuration being smaller than the second power offset between the PDSCH and the CSI-RS associated with the second sub-configuration.

13. The apparatus of claim 11, wherein the reduction condition includes:

the first number of CSI-RS antenna ports being less than the second number of CSI-RS antenna ports associated with the second sub-configuration of the subset of sub-configurations, and the first power offset between the PDSCH and the CSI-RS associated with the first sub-configuration being equal to the second power offset between the PDSCH and the CSI-RS associated with the second sub-configuration.

14. An apparatus of wireless communication at a network entity, comprising:

at least one memory; and at least one processor coupled to the at least one memory and, based at least in part on information stored in the at least one memory, the at least one processor is configured to:

transmit, to a user equipment (UE), a channel state information (CSI) report configuration comprising a set of sub-configurations, wherein each sub-configuration in the set of sub-configurations corresponds to a transmission setting associated with a channel state information reference signal (CSI-RS); and receive, based on the transmission setting corresponding to a first sub-configuration of the set of sub-configurations, and in response to a reduction condition being met, the CSI report with a reduced content or refrain from receiving the CSI report, wherein the CSI report is associated with a first CSI for the first sub-configuration, wherein the reduced content of the CSI report includes a subset of CSI parameters of the CSI report, and wherein the subset of CSI parameters of the CSI report excludes a rank indicator (RI), wherein the reduction condition includes:

a first number of CSI-RS antenna ports being less than or equal to a second number of CSI-RS antenna ports associated with a second sub-configuration of the set of sub-configurations, and a first power offset between a physical downlink shared channel (PDSCH) and the CSI-RS associated with the first sub-configuration being smaller than or equal to a second power offset between the PDSCH and the CSI-RS associated with the second sub-configuration, wherein the second sub-configuration has a rank of one.

15. The apparatus of claim 14, further comprising a transceiver coupled to the at least one processor, wherein, to transmit the CSI report configuration, the at least one processor is configured to transmit the CSI report configuration via the transceiver, and wherein the transmission setting corresponding to the first sub-configuration includes one or more:

a number of CSI-RS antenna ports for the first sub-configuration, or a power offset associated with the PDSCH for the first sub-configuration.

16. The apparatus of claim 15, wherein the transmission setting includes the number of CSI-RS antenna ports for the first sub-configuration, and wherein, to refrain from receiving the CSI report, the at least one processor is configured to:

refrain from receiving the CSI report in response to the first sub-configuration having the first number of CSI-RS antenna ports less than the second number of CSI-RS antenna ports of the second sub-configuration of the set of sub-configurations.

17. The apparatus of claim 15, wherein the transmission setting includes the number of CSI-RS antenna ports for the first sub-configuration, and wherein, to receive the CSI report with the reduced content, the at least one processor is configured to:

receive the CSI report with the reduced content in response to the first sub-configuration having the first number of CSI-RS antenna ports less than the second number of CSI-RS antenna ports of the second sub-configuration of the set of sub-configurations.

18. The apparatus of claim 17, wherein the subset of CSI parameters of the CSI report includes one or more parameters of part 1 CSI.

19. The apparatus of claim 18, wherein the one or more parameters of the part 1 CSI include one or more of: a channel rank indicator (CRI) or a channel quality indicator (CQI).

20. The apparatus of claim 15, wherein the power offset is between the PDSCH and the CSI-RS, or between the CSI-RS and a synchronization signal block (SSB).

21. The apparatus of claim 20, wherein the transmission setting includes the power offset, and wherein, to refrain from receiving the CSI report, the at least one processor is configured to:

refrain from receiving the CSI report in response to the first sub-configuration having the first power offset less than the second power offset of the second sub-configuration of the set of sub-configurations.

22. The apparatus of claim 20, wherein the transmission setting includes the power offset, and wherein, to receive the CSI report with the reduced content, the at least one processor is configured to:

receive the CSI report with the reduced content in response to the first sub-configuration having the first power offset less than the second power offset of the second sub-configuration of the set of sub-configurations, and wherein the reduced content of the CSI report includes the subset of CSI parameters of the CSI report.

23. The apparatus of claim 20, wherein the transmission setting corresponding to the first sub-configuration includes the number of CSI-RS antenna ports and the power offset, and wherein, to refrain from receiving the CSI report, the at least one processor is configured to:

refrain from receiving the CSI report in response to the reduction condition being met.

24. The apparatus of claim 23, wherein the reduction condition includes:

the first number of CSI-RS antenna ports being equal to the second number of CSI-RS antenna ports associated with the second sub-configuration of the set of sub-configurations, and the first power offset between the PDSCH and the CSI-RS associated with the first sub-configuration being smaller than the second power offset between the PDSCH and the CSI-RS associated with the second sub-configuration.

25. The apparatus of claim 23, wherein the reduction condition includes:

the first number of CSI-RS antenna ports being less than the second number of CSI-RS antenna ports associated with the second sub-configuration of the set of sub-configurations, and the first power offset between the PDSCH and the CSI-RS associated with the first sub-configuration being equal to the second power offset between the PDSCH and the CSI-RS associated with the second sub-configuration.

26. A method of wireless communication in a user equipment (UE), comprising:

receiving, from a network entity, a channel state information (CSI) report configuration comprising a set of sub-configurations, wherein each sub-configuration in the set of sub-configurations corresponds to a transmission setting associated with a channel state information reference signal (CSI-RS);

determining one or more CSIs respectively corresponding to a subset of the set of sub-configurations; and transmitting, based on the transmission setting corresponding to a first sub-configuration of the subset of sub-configurations, and in response to a reduction condition being met, a reduced content of a CSI report or refraining from transmitting the CSI report, wherein the CSI report is associated with a first CSI for the first sub-configuration, wherein the reduced content of the CSI report includes a subset of CSI parameters of the CSI report, and wherein the subset of CSI parameters of the CSI report excludes a rank indicator (RI), wherein the reduction condition includes:

a first number of CSI-RS antenna ports being less than or equal to a second number of CSI-RS antenna ports associated with a second sub-configuration of the subset of sub-configurations, and a first power offset between a physical downlink shared channel (PDSCH) and the CSI-RS associated with the first sub-configuration being smaller than or equal to a second power offset between the PDSCH and the CSI-RS associated with the second sub-configuration, wherein the second sub-configuration has a rank of one.

27. The method of claim 26, wherein the transmission setting corresponding to the first sub-configuration includes one or more:

a number of CSI-RS antenna ports for the first sub-configuration, or a power offset associated with the PDSCH for the first sub-configuration.

28. A method of wireless communication at a network entity, comprising:

transmitting, to a user equipment (UE), a channel state information (CSI) report configuration comprising a set of sub-configurations, wherein each sub-configuration in the set of sub-configurations corresponds to a transmission setting associated with a channel state information reference signal (CSI-RS); and receiving, based on the transmission setting corresponding to a first sub-configuration of the set of sub-configurations, and in response to a reduction condition being met, the CSI report with a reduced content or refraining from receiving the CSI report, wherein the CSI report is associated with a first CSI for the first sub-configuration, wherein the reduced content of the CSI report includes a subset of CSI parameters of the CSI report, and wherein the subset of CSI parameters of the CSI report excludes a rank indicator (RI), wherein the reduction condition includes:

a first number of CSI-RS antenna ports being less than or equal to a second number of CSI-RS antenna ports associated with a second sub-configuration of the set of sub-configurations, and a first power offset between a physical downlink shared channel (PDSCH) and the CSI-RS associated with the first sub-configuration being smaller than or equal to a second power offset between the PDSCH and the CSI-RS associated with the second sub-configuration, wherein the second sub-configuration has a rank of one.

* * * * *